United States Patent [19]

Halviatti et al.

[11] Patent Number: 5,475,843
[45] Date of Patent: Dec. 12, 1995

[54] SYSTEM AND METHODS FOR IMPROVED PROGRAM TESTING

[75] Inventors: Ramin L. Halviatti, Santa Cruz; Richard J. Potts, Palo Alto, both of Calif.

[73] Assignee: Borland International, Inc., Scotts Valley, Calif.

[21] Appl. No.: 140,904

[22] Filed: Oct. 21, 1993

Related U.S. Application Data

[63] Continuation-in-part of Ser. No. 970,724, Nov. 2, 1992, Pat. No. 5,432,940.

[51] Int. Cl.[6] .................................................. G06F 11/30
[52] U.S. Cl. ................................. 395/700; 364/DIG. 1; 364/282; 364/286
[58] Field of Search ........................... 395/155, 161, 395/700, 650

[56] References Cited

U.S. PATENT DOCUMENTS

| | | | |
|---|---|---|---|
| 4,622,013 | 11/1986 | Cerchio | 434/118 |
| 4,789,962 | 12/1988 | Berry et al. | 364/DIG. 2 |
| 4,901,221 | 2/1990 | Kodosky et al. | 364/DIG. 1 |
| 4,947,346 | 8/1990 | Kamiya | 364/521 |
| 4,964,077 | 10/1990 | Eisen et al. | 364/DIG. 2 |
| 5,103,498 | 4/1992 | Lanier et al. | 395/68 |
| 5,175,812 | 12/1992 | Krieger | 395/156 |
| 5,204,968 | 4/1993 | Parthasarathi | 395/800 |
| 5,239,617 | 8/1993 | Gardner et al. | 395/12 |

OTHER PUBLICATIONS

Kepple, L., *Testing GUI Applications: The Logic of Automation*, Proceedings: 10th International Conference and Exposition on Testing Computer Software: Risk Driven Testing, Jun. 14–17, 1991, Washington, D.C., pp. 37–46.

Wolters, W. *High Automated Testing for GUI Displays*, Proceedings: 10th International Conference and Exposition on Testing Computer Software: Risk Driven Testing, Jun. 14–17, 1991, Washington, D.C., pp. 111–116.

Needleman, Raphael, *Wizards' Make Works, Publisher Easy*, Infoworld, Sep. 16, 1991, p. 78.

Matthies, Kurt, W. G., *Balloon Help Takes Off*, MacUser, Dec. 1991, pp. 241–248.

*Primary Examiner*—Thomas M. Heckler
*Attorney, Agent, or Firm*—John A. Smart

[57] ABSTRACT

The present invention includes a Computer-based Training system (CBT) having one or more Application Translation Units (ATUs), a Message Engine, and a Script Engine. For one or more target applications of interest, an ATU is provided for processing events specific to that application, thereby trapping events and translating them into abstract messages or "meta-messages" for conveying information about a particular event to the system. A computer-aided software testing embodiment of the present invention is also described. The system provides prefabricated building blocks for constructing a high-level model of an application's User Interface (UI). This high-level model serves as a middle ground between test scripts and the application being tested. The knowledge of how a given UI element is controlled or how it can be observed is retained in the model rather than in a test script. Consequently, the test script consists of easy-to-maintain, high-level testing commands only.

35 Claims, 23 Drawing Sheets

"FILE" POPUP RESOURCE INFORMATION 890

```
POPUP "&File"
BEGIN
        MENUITEM "&New", 9
        MENUITEM "&Open...", 10
        MENUITEM "&Save", 1
        MENUITEM "Save &As...", 2
        MENUITEM "&Print", 14
        MENUITEM "Page Se&tup...", 32
        MENUITEM "P&rint Setup...", 31
        MENUITEM SEPARATOR
        MENUITEM "E&xit", 28
END
```

"FILE" POPUP MODEL INFORMATION 895

```
class FileMenuATM( Parent, Id ) of PopupMenu( Parent, Id )
        MenuItem    New        ( Self, 9 )
        MenuItem    Open       ( Self, 10 )
        MenuItem    Save       ( Self, 1 )
        MenuItem    SaveAs     ( Self, 2 )
        MenuItem    Print      ( Self, 14 )
        MenuItem    Page       ( Self, 32 )
        MenuItem    PrintSetUp( Self, 32 )
        MenuItem    ExitOut    ( Self, 28 )

NumOfKids = 8

Components[0] =    New
        Components[1] =    Open
        Components[2] =    Save
        Components[3] =    SaveAs
        Components[4] =    Print
        Components[5] =    Page
        Components[6] =    PrintSetUp
        Components[7] =    ExitOut
        Children = Components
end
```

*FIG. 8D*

*"EDIT" POPUP RESOURCE INFORMATION*

```
POPUP "&Edit"
BEGIN
        MENUITEM "&Undo\tCtrl+Z", 25
        MENUITEM SEPARATOR
        MENUITEM "Cu&t\tCtrl+X", 768
        MENUITEM "&Copy\tCtrl+C", 769
        MENUITEM "&Paste\tCtrl+V", 770
        MENUITEM "De&lete\tDel", 771
        MENUITEM SEPARATOR
        MENUITEM "Select &All", 7
        MENUITEM "Time/&Date\tF5", 12
        MENUITEM SEPARATOR
        MENUITEM "&Word Wrap", 27
END
```

*"EDIT" POPUP MODEL INFORMATION*

```
class EditMenuATM( Parent, Id ) of PopupMenu( Parent, Id )
        MenuItem    Undo    ( Self, 25 )
        MenuItem    Cut     ( Self, 768 )
        MenuItem    Copy    ( Self, 769 )
        MenuItem    Paste   ( Self, 770 )
        MenuItem    Delete  ( Self, 771 )
        MenuItem    All     ( Self, 7 )
        MenuItem    Time    ( Self, 12 )
        MenuItem    WordWrap( Self, 27 )

NumOfKids = 8

Components[0] =   Undo
        Components[1] =   Cut
        Components[2] =   Copy
        Components[3] =   Past
        Components[4] =   Delete
        Components[5] =   All
        Components[6] =   Time
        Components[7] =   WordWrap
        Children = Components
end
```

*FIG. 8E*

SYSTEM AND METHODS FOR IMPROVED PROGRAM TESTING

The present application is a continuation-in-part of commonly-assigned application Ser. No. 07/970,724, filed Nov. 2, 1992 now U.S. Pat. No. 5,432,940, the disclosure of which is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to system and methods for testing reliability of software programs. More particularly, the present invention relates to a computer-aided software testing system and methods which assist a Quality-Assurance engineer and software developers with the testing of Graphical User Interface (GUI) software programs operative on digital computers.

Development of software is largely a trial and error process. Accordingly, substantial development resources are allocated to the process of finding "bugs"—errors occurring in the program being developed. Expectedly, there is keen interest in finding ways to improving the testing of software.

As software is developed on and runs on computers, it is not surprising to find that many of the techniques for automating the testing of software have been implemented in digital computers. A common approach for testing software is the use of test suites. Test suites compare "known good" outputs of a program (for a given set of input) against the current output. Tests that check program file output are easy to implement and can be automated with shell scripts (e.g., Expect available on the Internet). For programs with user interfaces that communicate to standard input/output devices (stdin/stdout), a similar method may be employed. Capture/playback tools are available for recording keyboard input and program output as a person tests a program.

Much of the code written today is for software products with a graphical user interface (GUI), such as Microsoft® Windows™. In fact, much of software development itself is done within a graphical user interface, with software tool vendors providing products which allow software developers to develop GUI software using visual programming techniques. The Quality Assurance (QA) engineer faces more complex problems when testing GUI software. In particular, GUI programs must behave correctly regardless of which video mode or operating environment is being employed.

Intuitively, testing user interfaces should not be as difficult as testing a complex internal engine, such as a compiler or a real-time, multi-user operating system. In practice, however, user interface (UI) testing is the most challenging part of the QA process. This problem stems largely from the difficulty in automating UI tests. Tests for complex engines, in contrast, are often command-line programs whose testing can easily be automated using simple batch execution. Thus despite the plethora of present day tools for automating program testing, the task of developing, maintaining and analyzing the results of UI tests remains an arduous task.

The basic steps traditionally employed to test user interfaces may be summarized as follows. First, the application being tested is controlled by placing it into a specific state using either pre-recorded keyboard or mouse device actions, or entering input through a test script. Next, the then-current state of the application is recorded by taking a screenshot (e.g., capturing a screen bitmap). Finally, the captured screenshot is compared with a baseline screenshot that is known to be valid.

The approach is far from ideal, however. Consider, for instance, the determination of whether the state of a check box is valid within a specific dialog box. Here, the QA engineer must take a screenshot of that check box and compare it with the expected image. Thus, testing of even the simplest component is laborious. Moreover, the approach itself is prone to error. A change of just a few pixels across all windows—a common occurrence in GUI software development—causes all tests to fail. Consequently, as software becomes more and more complex, it becomes less and less feasible to test user interface tasks with present-day screen comparison methodology. A better approach is needed.

SUMMARY OF THE INVENTION

The present invention includes, in a first embodiment, a Computer-based Training system (CBT) having one or more Application Translation Units (ATUs), a Message Engine, and a Script Engine. Specific operation of the system is directed by a series of user instructions, typically provided by a tutorial writer. Within the script, links are established between the CBT system and one or more target applications of interest. Specifically, within a particular application links are established with individual controls (e.g., menu items, button controls, dialog boxes, and the like) so that the script writer has complete control over the behavior and actions of the target application.

For each target application of interest, an ATU is provided for processing events specific to that application. A general Operating System (OS) ATU is also provided for trapping general system events. The ATUs function to trap events and translate them into abstract messages or "meta-messages" for conveying information about a particular event to the system. In this manner, low-level messages are abstracted into high-level, more meaningful messages which may be acted upon through the script.

Translated event messages are forwarded to the Message Engine for matching with event handlers. In a preferred embodiment, the Message Engine maintains a lookup table for matching messages with a desired target handler. System or application-specific messages which are not of interest are simply allowed to pass through. From the Message Engine, the individual handlers dispatch their respective messages to the Script Engine. The Script Engine, in turn, matches an incoming message with reserved words of the script. Appropriate action, based upon use of the reserved word within the script, is then effected.

A software testing automation embodiment of the present invention is also described. The system includes a Generic Element Models (GEMs) library, Application-specific Testing Models (ATMs), a Resource Database, one or more Model Generators, a Test Runtime Library, as well as the above-mentioned Script Engine, Message Engine, and Application Translation Units (ATUs).

The system employs the Model Generator to decompose the application under test to generate the ATMs. Each ATM is a high-level model for a specific component of the application being tested, such as a File Open dialog. ATMs describe the actual component which they represent in terms of Generic Element Models (stored in GEMs Library). A GEM encapsulates the behavior of irreducible user interface elements such as push buttons, checkboxes, listboxes, and the like. Knowledge of how a given UI element is controlled or how it can be observed is retained in the model rather than in a test script. This high-level model serves as a middle ground between test scripts and the application being tested. In this fashion, a script for testing operation of a program need only consist of easy-to-maintain, high-level testing commands.

During operation, the system maintains an in-memory Testing Model of a particular application under test. Overall operation of the system is directed by one or more test scripts. GEMs are instantiated when an ATM corresponding to an active state of the application under test is activated by the Model Manager. GEMs load their expected results from the Resource Database and are capable of binding themselves dynamically to the actual object on the screen which they represent. Each GEM therefore can perform a "self test" on itself by simply comparing its expected result (as stored in the Resource Database) to its actual behavior (as displayed on the screen at runtime). In this manner, an entire application can perform a self test by simply asking all its components to test themselves in turn.

GEMs of the present invention provide maximum controllability and observability over the actual screen objects that they represent. By breaking the user interface down into irreducible components which are modeled to provide maximum controllability and observability (over the actual screen objects that they represent), the Test Model created provides maximum controllability and observability. Accordingly, testing effectiveness is maximized.

BRIEF DESCRIPTION OF THE DRAWINGS

FIGS. 8D–E are diagrams illustrating the relationship between resource information (however extracted) and Application-specific Testing Models (ATMs) constructed by the system of the present invention.

GLOSSARY OF TERMS

CBT: Computer-based Training; the use of computers and specially designed tutorial programs for teaching.

CBT Message: A high-level or meta-message describing or encapsulating information about a particular event which has occurred, thereby allowing the user to abstract low level system messages into high level (and more meaningful) messages for script control.

CBT Object: An object, such as a C++ object, which can be placed in a Dynamic Link Library (DLL) and dynamically loaded when the tutorial is executed.

Control Window: A CBT object which is used for getting information from the user; typically, it includes a window having a number of dialog controls.

Interaction Objects: CBT objects which are used to interact with the user. These objects include Presentation windows, Control windows and message handlers.

Lesson Script: Script statements which control the execution of the CBT tutorial. Each lesson includes a collection of Scenes.

List: A container object which is used to hold unorganized data.

Message Handler: A CBT object which interacts with the target application. These objects are used to handle external events.

Object Property: An attribute or other data associated with a particular object, for example, name, title, color, and the like.

Performance: The execution of a CBT Scene by the CBT system.

Scene: A script object which describes the actions to perform at a particular point in the CBT lesson.

Script: A collection of statements which are understood by a Script Engine.

Windows Hook: A function installed between the Windows OS and an application to intercept Windows events before they are received by the application.

DETAILED DESCRIPTION OF A PREFERRED EMBODIMENT

The following description will focus on the presently preferred embodiment of the present invention, which is operative in the Microsoft® Windows environment. The present invention, however, is not limited to any particular one application or any particular windows environment. Instead, those skilled in the art will find that the system and methods of the present invention may be advantageously applied to a variety of system and application software, including database management systems, wordprocessors, spreadsheets, and the like. Moreover, the present invention may be embodied on a variety of different platforms, including Macintosh, UNIX, NextStep, and the like. Therefore, the description of the exemplary embodiments which follows is for purposes of illustration and not limitation.

System Hardware

Figure 1A:
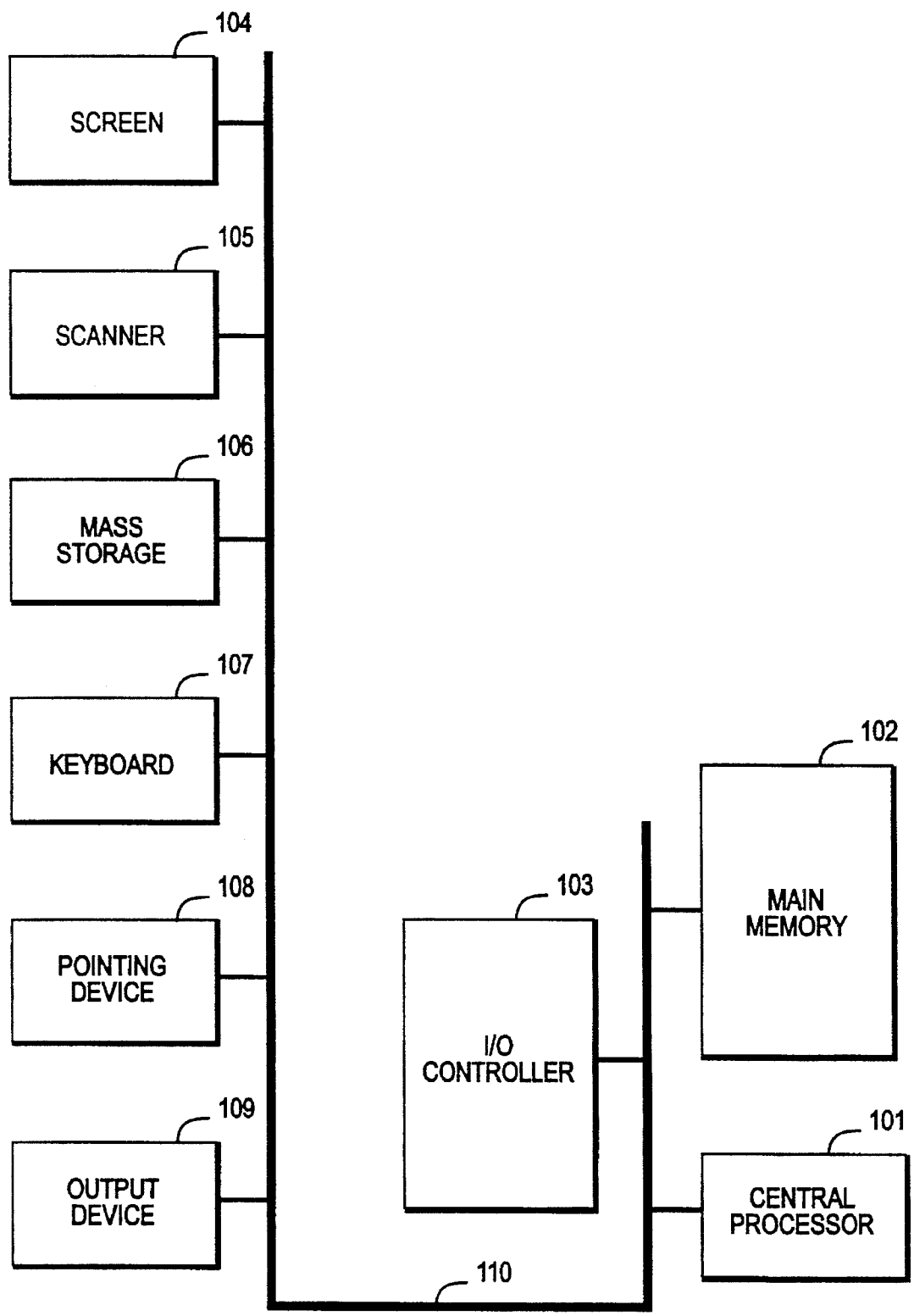
FIG. 1A is a block diagram of a computer system in which the present invention may be embodied.

As shown in FIG. 1A, the present invention may be embodied in a computer system such as the system 100, which comprises a central processor 101, a main memory 102, an input/output controller 103, a keyboard 104, a pointing device 105 (e.g., mouse, track ball, pen device, or the like), a display device 106, and a mass storage 107 (e.g., hard disk). Additional input/output devices, such as a printing device 108, may be included in the system 100 as desired. As illustrated, the various components of the system 100 communicate through a system bus 110 or similar architecture. In a preferred embodiment, the computer system 100 includes an IBM-compatible personal computer, which is available from several vendors (including IBM of Armonk, N.Y.).

System Software

A. Overview

Figure 1B:
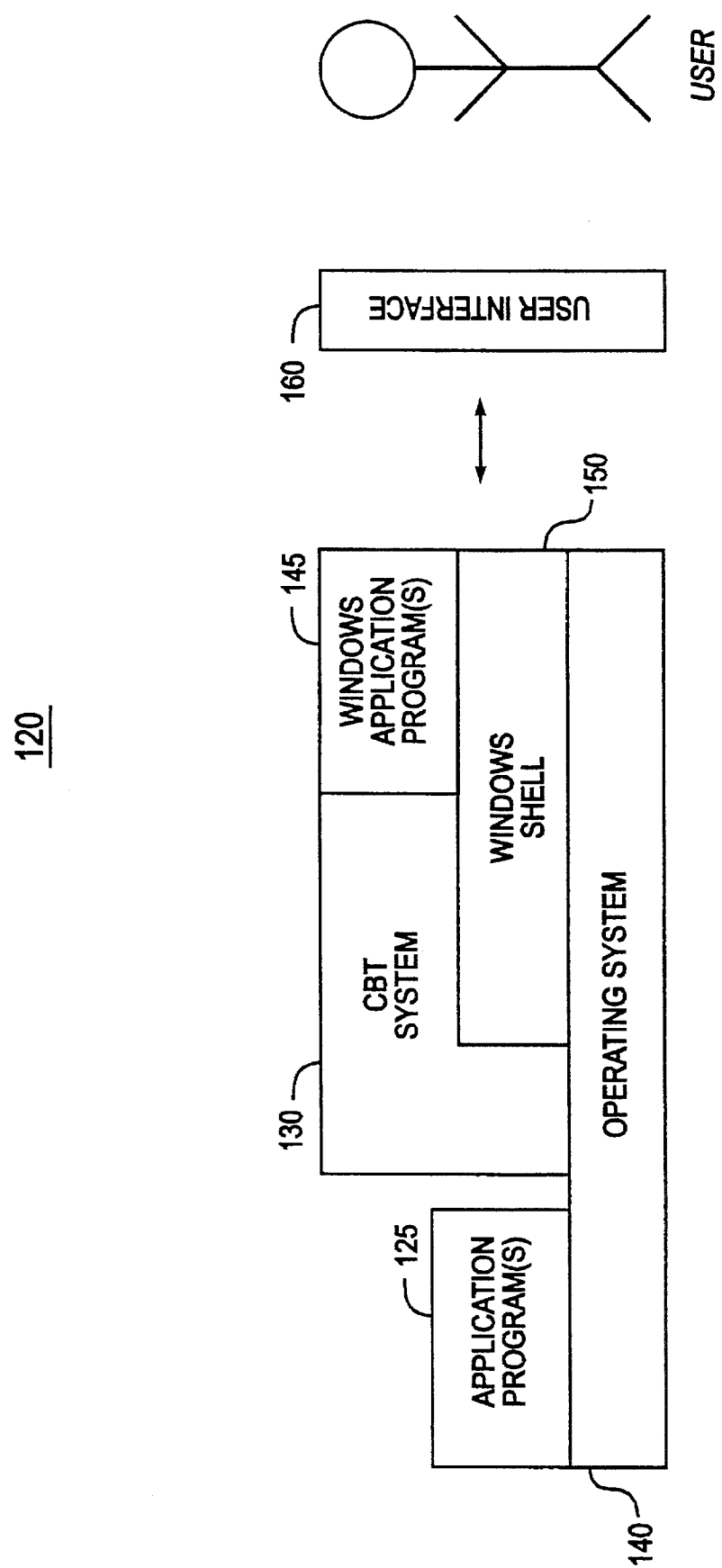
FIG. 1B is a block diagram of a software system of the present invention, which includes operating system, application software, and user interface components.

Illustrated in FIG. 1B, a computer software system 150 is provided for directing the operation of the computer system 100. Software system 150, which is stored in system memory 102 and on disk memory 107, includes a kernel or operating system (OS) 160 and a windows shell 180. One or more application programs, such as application software 170 or windows application software 190, may be "loaded" (i.e., transferred from storage 107 into memory 102) for execution by the system 100.

System 150 includes a user interface (UI) 165, preferably a graphical user interface (GUI), for receiving user commands and data. These inputs, in turn, may be acted upon by the system 100 in accordance with instructions from operating module 160, Windows 180, and/or application modules 170, 190. The UI 165 also serves to display the results of an operation, whereupon the user may supply additional inputs or terminate the session. Although shown conceptually as a separate module, the UI is typically provided by Windows shell 180, operating under OS 160. In a preferred embodiment, OS 160 is MS-DOS and Windows 180 is Microsoft® Windows; both are available from Microsoft Corporation of Redmond, Wash.

System 150 also includes a Computer-based Training (CBT) system 200 of the present invention for aiding users of the computer 100. As shown, the CBT system 200 interfaces with the system 100 through Windows shell 180, as well as interfacing directly through OS 160. Before undertaking a detailed description of the construction and operation of the CBT system 200 itself, however, it is helpful to first examine the general methodology of UI 165 and the event-driven architecture driving its operation.

B. Graphical User (Windowing) Interface

Figure 1C:
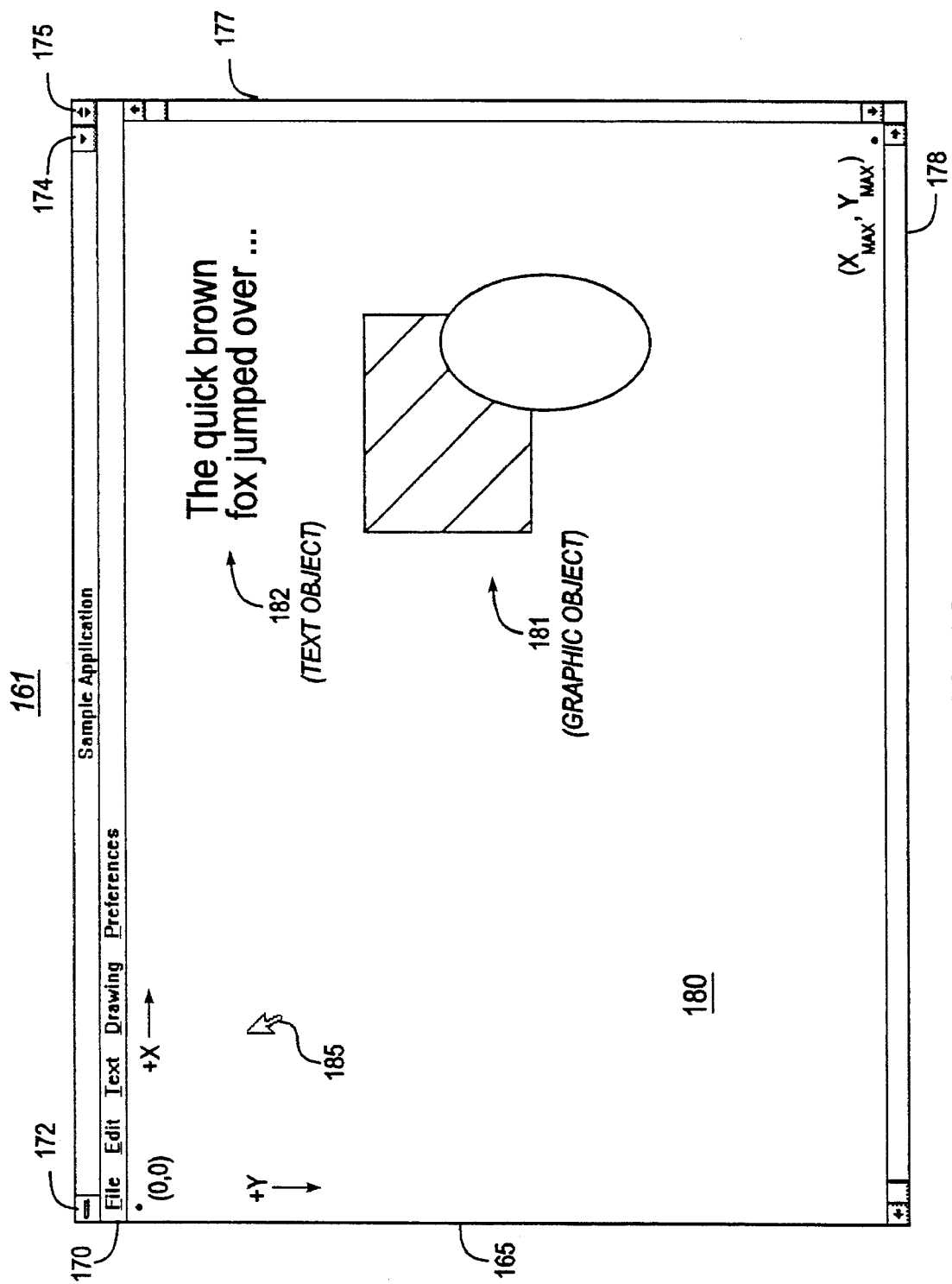
FIG. 1C is a bitmap screenshot illustrating the basic architecture and functionality of a graphical user interface in which the present invention may be embodied.

As shown in FIG. 1C, the system 100 typically presents UI 160 as a windowing interface or workspace 161. Window 161 is a rectangular, graphical user interface (GUI) for display on screen 106; additional windowing elements may be displayed in various sizes and formats (e.g., tiled or cascaded), as desired. At the top of window 161 is a menu bar 170 with a plurality of user-command choices, each of which may invoke additional submenus and software tools for use with application objects. Window 161 includes a client area 180 for displaying and manipulating screen objects, such as graphic object 181 and text object 182. In essence, the client area is a workspace or viewport for the user to interact with data objects which reside within the computer system 100.

Windowing interface 161 includes a screen cursor or pointer 185 for selecting and otherwise invoking screen objects of interest. In response to user movement signals from the pointing device 105, the cursor 185 floats (i.e., freely moves) across the screen 106 to a desired screen location. During or after cursor movement, the user may generate user-event signals (e.g., mouse button "clicks" and "drags") for selecting and manipulating objects, as is known in the art. For example, Window 161 may be closed, resized, or scrolled by "clicking on" (selecting) screen components 172, 174/5, and 177/8, respectively. Keystroke equivalents, including keyboard accelerators or "hot keys", are provided for performing these and other user operations through keyboard 104.

C. Event-driven Architecture

Underlying the windowing interface is a message or event-driven architecture. This model is perhaps best described by contrasting its operation with that of a modal or sequential architecture which has been traditionally employed. In this manner, the reader may appreciate the added flexibility of a message-driven system—flexibility which is employed by the CBT system of the present invention for providing hi-directional communication not only between the CBT system and a user but between the CBT system and a target application as well.

Figure 2:
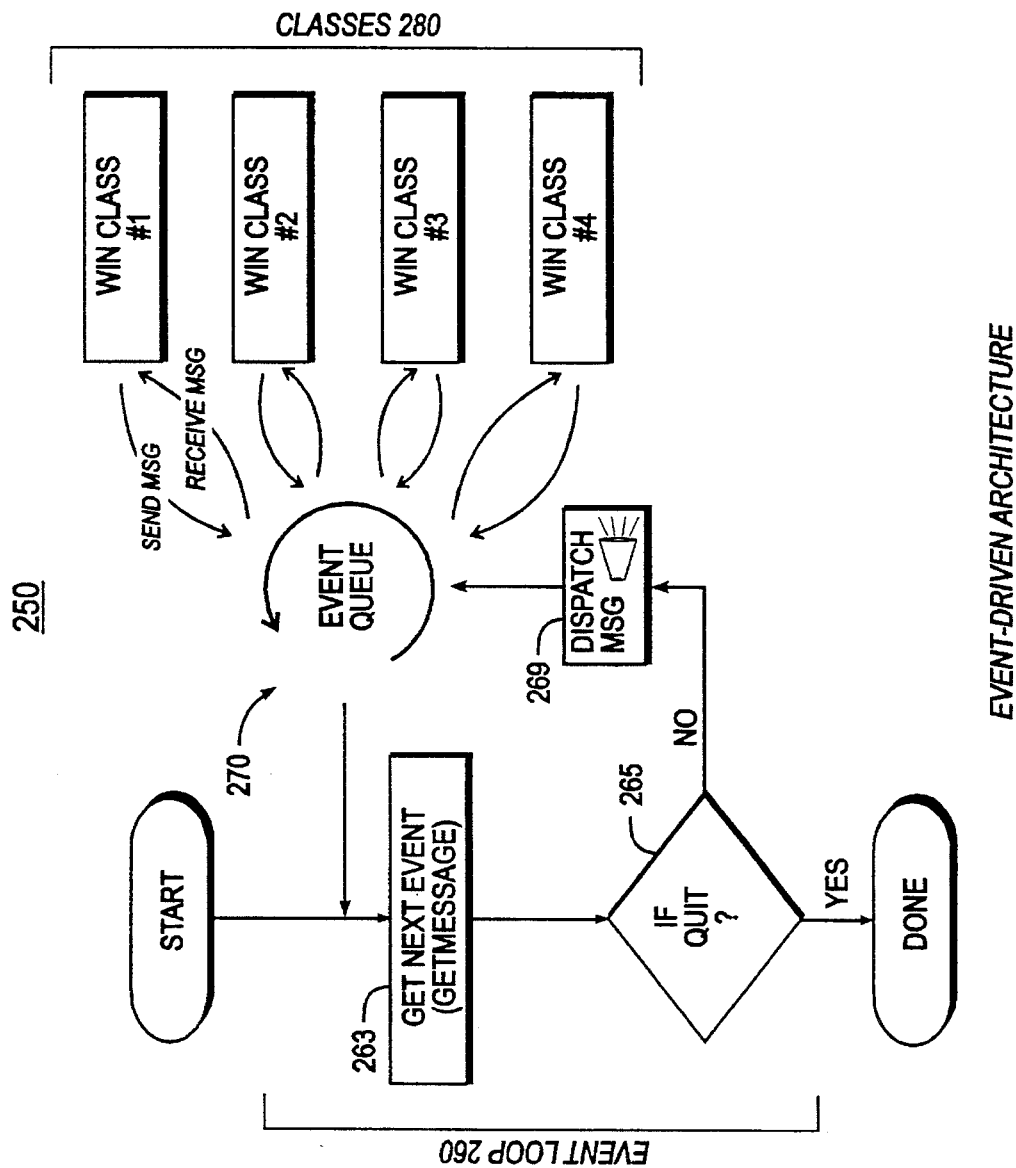
FIG. 2 is a pair of flowcharts contrasting the operation of conventional modal architecture with that of event-driven architecture.
Figure 2:
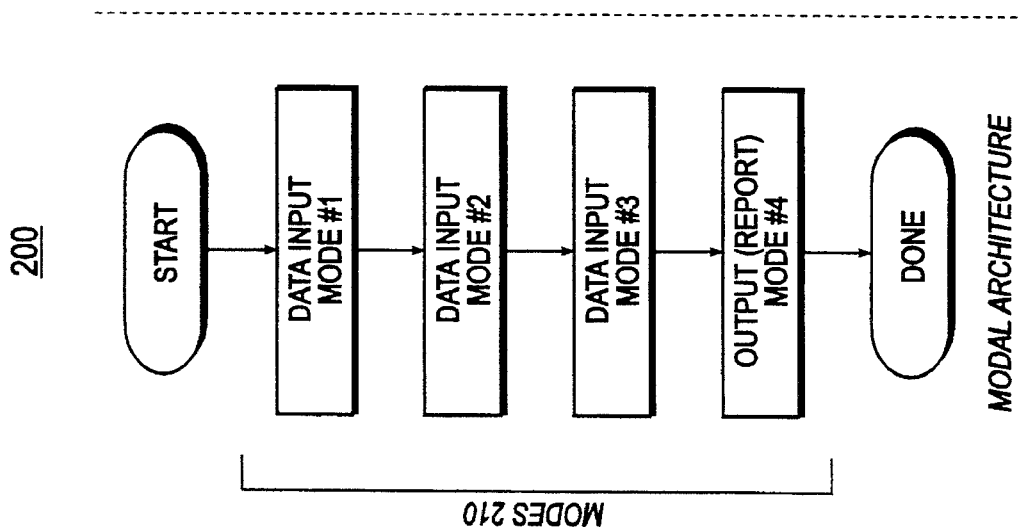

As shown in FIG. 2, a modal program 200 comprises a series of discrete operating blocks or modes 210, with a well-defined beginning, middle and end. In actual operation, such a program typically displays a series of input screens for receiving user information, for example, to create a written report. For instance, the first entry screen may require a customer name, the second a customer address, the third a part number, and so on. The program typically terminates in an output mode, for reporting results determined from the various inputs. Thus, the program 200 follows a fairly rigid sequence of operation, with each input or entry mode demanding successful completion before the program proceeds to the next step.

While a modal program is relatively easy to design and implement, it is not so easy to use. The design certainly ensures that all required information is entered, but only at the expense of forcing users to operation in a manner dictated by the program. Specifically, since the program is built around a pre-arranged set of modes, a user cannot get from one mode to another without first completing a previously-required mode. In the present example, for instance, a user must needlessly complete a customer name entry screen (and any other intervening input screens) just to access part number information. Any deviation from this sequence by the user is simply not permitted. Lacking flexibility, modal programs make a poor choice for handling real-world tasks.

As shown in the second half of FIG. 2, an event-driven architecture 250 eschews a pre-selected sequence, opting instead for an "event loop." The event loop 260 is a centralized mechanism for processing messages about user and system events. It includes an event queue 270 and mechanisms for retrieving 263 and dispatching 269 messages to various window classes 280. Before each of these components is described in detail, it is helpful to have a firm understanding of "messages."

In a typical modal environment, especially those typified by a character-based UI, a program reads from the keyboard by making an explicit call to a function, such as the C function getchar(). The function typically waits until the user presses a key before returning the character code to the program; all system activity ceases until completion of this one step. In a Windows environment, in contrast, the operating system uses messages to manage and synchronize multiple applications and hardware events, such as clicks of a mouse or presses of a keyboard, which are converted to messages by Windows event handlers.

From a programming perspective, a message is simply a data structure containing information about a particular event. In Microsoft Windows, a message is a 16-bit unsigned integer which serves as a symbolic constant for a particular event; packaged within this integer is a message identifier and message parameters, which vary with each event type represented. For example, messages from a window object might include information about creating (WM_CREATE), closing (WM_CLOSE), moving (WM_MOVE), and resizing (WM_SIZE) the window. The input messages are collected in a system-wide queue and then directed to the proper window. These messages, along with timer and screen paint messages, must be passed to the target application(s) of interest.

A mechanism is provided for retrieving messages from the system queue and dispatching them to the appropriate application which, in turn, may proceed to process any message that arrives. Each window belongs to a certain window type which defines certain characteristics common to all windows of that type. Associated with each type is a Windows function which processes all messages sent to windows of its type. An application queue is provided where windows may place messages that belong to a specific application. When the application is ready to receive input, it simply reads the awaiting messages. If none are found or if there exists a message for other applications with higher priority, Windows passes control to the other applications.

The message or event loop 260 shown in FIG. 2, for example, may be simply coded as:

```
while (GetMessage (&msg, NULL, 0, 0))
{
TranslateMessage (&msg) ;
DispatchMessage (&msg) ;
}
return msg.wParam ;
}
``` where a message (&msg) is retrieved by a call to GetMessage (step 263); if needed, the retrieved message may be translated by a call to TranslateMessage() and then dispatched by a call to DispatchMessage (step 269). This "while" loop continues until the GetMessage function returns a value of zero—indicating that the loop has read a WM_QUIT message from the queue, telling the application to end (yes at step 265).

In addition to the messages generated by Windows, applications can create their own messages and place them in the application queues of other applications. The SendMessage and PostMessage functions let applications pass messages to their windows or to the windows of other applications. The PostMessage function directs Windows to post the message by placing it in the application queue. Control returns immediately to the calling application, and any action to be carried out as a result of the message does not occur until the message is read from the queue.

The SendMessage function, on the other hand, directs Windows to send a message directly to the given Windows function, thereby bypassing the application queue. Windows does not return control to the calling application until the Windows function that receives the message has processed it. Such an unqueued message, however, is generally a message that affects the window only.

The general mechanism for retrieving and dispatching messages in an event-based system, such as Microsoft Windows, is known in the art; see, e.g., Petzold, C., Programming Windows, Second Edition, Microsoft Press, 1990. Additional information can be found in Microsoft's Window Software Development Kit, including: 1) Guide to Programming, 2) Reference, Vols. 1 and 2, and 3) Tools, all available from Microsoft Corp. of Redmond, Wash. The disclosures of each of the foregoing are hereby incorporated by reference.

First embodiment: Computer-based Training System

The following description of the CBT system of the present invention will focus on the presently preferred embodiment which includes components implemented in an event-driven architecture with the C++ programming language. In particular, an object-oriented model is adopted whereby new objects may be created from existing objects (classes). The general features of C++, including data encapsulation, inheritance, and polymorphism, as well as C++ techniques for implementing class hierarchies and class methods are known; see e.g., Ellis, M. and Stroustrup, B., The Annotated C++ Reference Manual, Addison-Wesley, 1990. Additional information about object-oriented programming and C++ in particular can be found in Borland® C++3.1: 1) User's Guide, 2) Programmer's Guide, and 3) Library Reference, all available from Borland International of Scotts Valley, Calif. The disclosures of each of the foregoing are hereby incorporated by reference.

A. Overview

Figure 3:
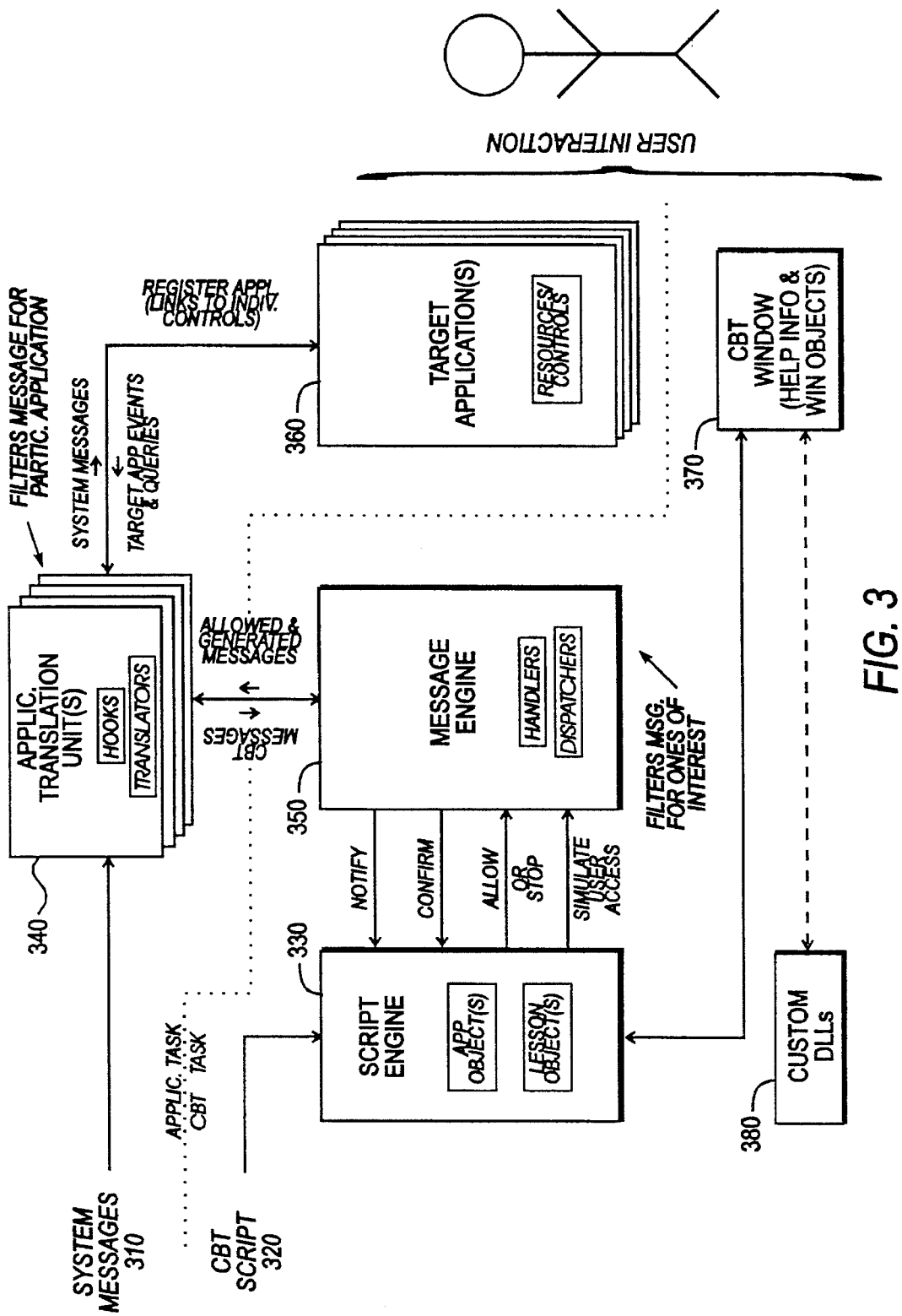
FIG. 3 is a block diagram of a Computer-based Training (CBT) system of the present invention.

Referring now to FIG. 3, a Computer-based Training system 300 of the present invention includes one or more Application Translation Units (ATUs) 340, a Message Engine 350, and a Script Engine 330. Also shown, the system 300 includes a CBT window object 370 operably coupled to the Script Engine; CBT window object 370, in turn, may be linked to one or more custom Dynamic Link Libraries (DLLs) 380.

Driven by a set of instructions or script 320, the system 300 monitors various events of the Windows system and desired target applications. Messages from these events, including system messages 310 and target application messages, are trapped by the ATUs 340 and reported to the Message Engine 350 as CBT messages. The Message Engine, in turn, dispatches the messages according to handlers specified by the Script Engine 330, operating under the control of script 320. Messages of interest are processed as desired; others are simply allowed to pass through. The construction and operation of these components will now be described in further detail.

1. Application Translation Units and their Target Applications

In normal operation of the system 100, a user is using one or more Windows application programs, for example, programs 145 of FIG. 1B, which can be a spreadsheet, word-processor, database, or the like. For each application where CBT support is desired, an application-specific ATU 340 is provided for processing events specific to that application (now shown as target application 360 in FIG. 3). Thus, each ATU 340 is a module, preferably implemented as a Dynamic Link Library (DLL), for processing messages for a specific target application.

In addition to the application-specific DLLs, ATUs 340 include a Windows ATU. In contrast to the other ATUs which hook into specific target applications, the Windows ATU processes all Windows events, including system messages 310. In this manner, general system events, that is, ones not specific to any particular application, may be processed by the CBT system 300 as well.

Whether application specific or not, each ATU functions to trap events and convert them into "CBT messages"—a lingua franca or common language for all events, whether Windows or application-specific, occurring within the system. More particularly, a CBT message is a meta-message, that is, a high-level message describing one or more events which have occurred. For instance, instead of monitoring numerous, low-level system messages, such as WM_RBUTTONDOWN, WM_LBUTTONDOWN, WM_RBUTTONUP, WM_LBUTTONUP, and the like, the user/script writer need only monitor a single message CBT_MOUSECLICK; the task of determining what the Windows system or application is doing is left to the ATUs. By abstracting low-level system messages into high-level (and more meaningful) CBT messages, the system of the present invention greatly simplifies script design and writing.

A CBT message, which is stored internally as an integer, represents a particular type of event. Information or data particular to each event, such as active window, cursor location, and the like, on the other hand, are packaged as a discreet data object (EventInfo object) fully describing the event. EventInfo objects, along with CBT messages, are dispatched from the ATU to the Message Engine 350 for further processing.

2. Message Engine and Scripts

The Message Engine 350 determines which of the many CBT messages it receives is of particular interest to the CBT system, as it operates under the direction of a script 320. At startup, each target application of interest to the script 320 is registered with the Message Engine. The script 320, which itself includes a collection of objects, may be compiled, pre-compiled, pseudocompiled, or the like, as desired for a particular platform. In a preferred embodiment, script 320 is pre-tokenized, whereby source listings and comments (optionally) are stored in a compact form which may be reconstructed into the original source. Thus, script 320 need only be a set of instructions; no particular format is required by the present invention.

For each application registered, the Message Engine maintains one or more "handlers" or modules for processing events specific to that application (as represented by the CBT messages). Thus, the Message Engine manages a list of target handlers for determining which CBT messages are of interest to the script 320, that is, which messages map into the list.

Messages which are of interest to the system, i.e., those specified by the script 320, are trapped and forwarded to a designated handler. Those messages which are not of interest are allowed to "fall through" (i.e., be passed on to) the individual target applications 360. In essence, the Message Engine filters the events for a particular application so that only those of interest, that is, those having a handler defined for the event, are processed.

B. System operation

1. Method: CBT session

Figure 4A:
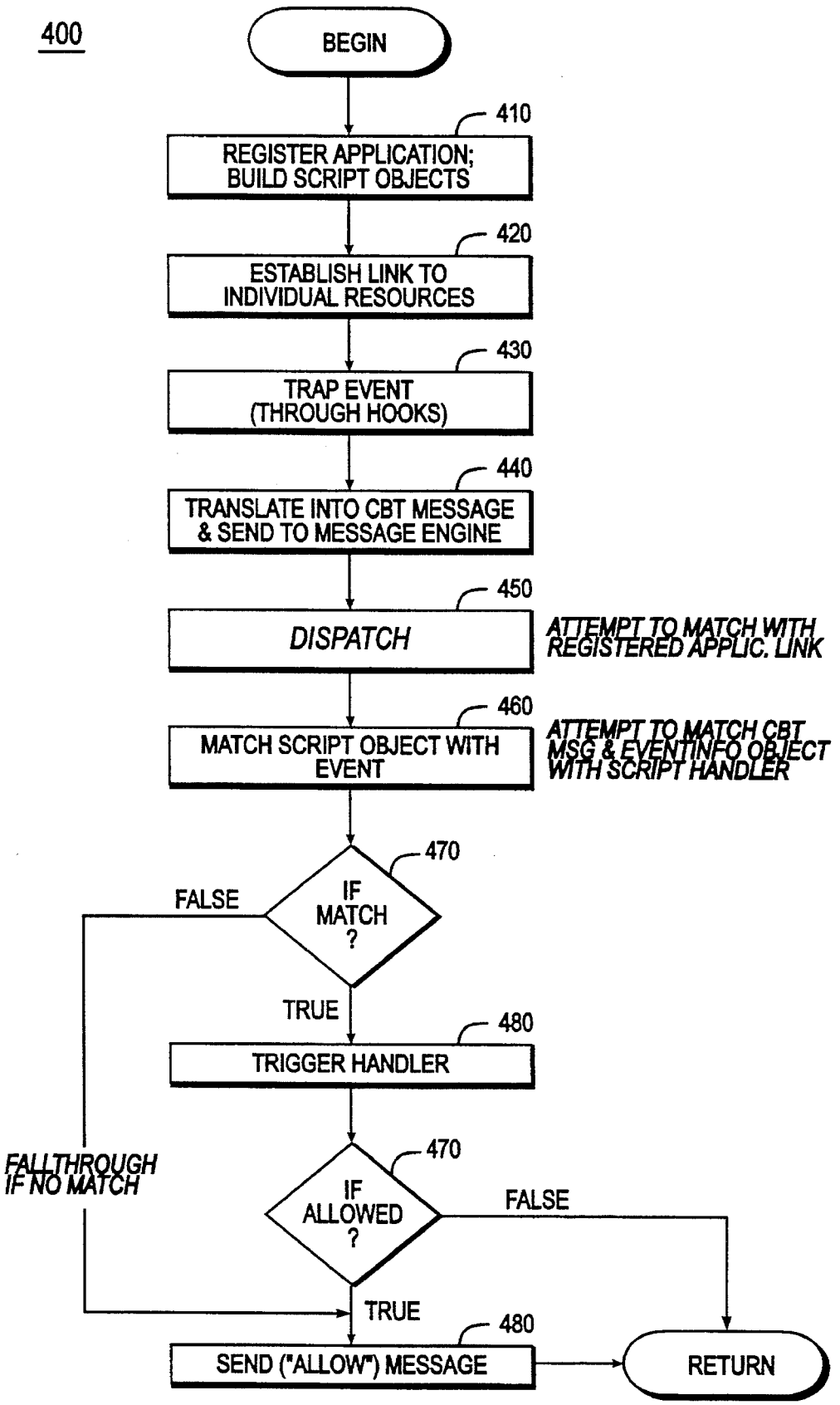
FIG. 4A is a flowchart illustrating a method of the present invention for operating the CBT system of FIG. 3.
Figure 4B:
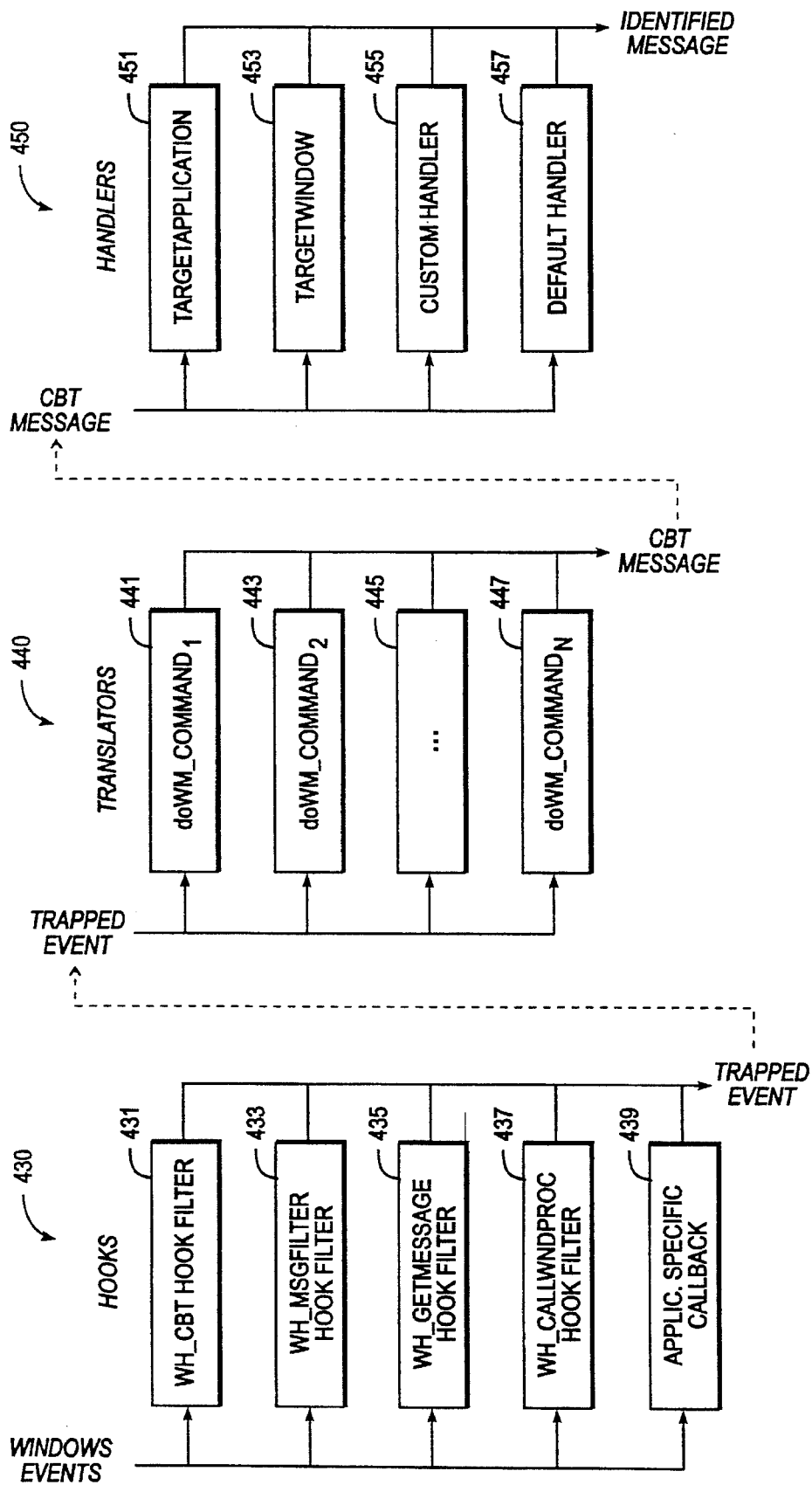
FIG. 4B is a flowchart illustrating the operation of hooks, dispatchers, and handlers of the method of FIG. 4A.

Referring now to FIGS. 4A–B, the general method of operation for the system 300 is illustrated by a flowchart 400. While the general methodology remains the same from one CBT session to another, the reader should understand that the specific steps of any one CBT session are dictated by instructions and script objects defined in the script 320. For instance, the script 320 states which specific target applications will be registered with the Message Engine and which events of those applications will be dispatched. Thus, the following description illustrates the basic framework in which the CBT system operates.

Under the direction of the script 320, at step 410 the CBT system registers a target application of interest by creating a CBTApplication object. Serving as the main entry point for the CBT system, this object initializes and executes the script tutorial. Moreover, the object initiates sessions with the Message Engine and Script Engine and acts as a centralized dispatch point for all external functions and object method calls within each CBT lesson. From here individual CBT lessons are loaded and performed.

When a lesson script is loaded the CBTApplication object creates a CBTLesson object which is responsible for managing that particular lesson. The CBTLesson object reads the lesson script and builds a deck of CBTScene objects, with each corresponding to a scene described in the lesson script. Alternatively, each scene may be constructed on- the-fly, particularly in high-performance environments. The CBTLesson object resembles a state machine; it maintains the active scene (active state) and sends appropriate script scenes (CBTScene objects) to the Script Engine 330 for presentation. Each object is directly accessible to the script writer through script variables; for example, the CBTApplication object is accessed through a theCBTApp global variable, the CBTLesson object through a theCBTLesson global variable.

To complete the initialization of step 410, the target application is registered with the Message Engine 350. In particular, hooks are installed by a corresponding ATU 340 so that events within the target application of interest are trapped. As set forth below, these events will, in turn, be reported to the Message Engine 350 as CBT messages.

At step 420, script-specified links are established to individual resources of interest. Within the target application itself, various resources (e.g., buttons, menus, and the like) may be of interest to the script writer. For example, if one were interested in a particular button of the target application, such as a "help" button, that button may be registered with the Message Engine 350. Events associated with that button (e.g., "mouse enter" the button) are then trapped for processing by an ATU.

The links are specified within the CBT script 320 as follows. In a preferred embodiment, a link is established to an individual resource or control by indicating a selected one of its Windows class name, Window title, or Resource ID, all of which are readily accessible Windows data structures. Commonly, a link will be established by using the Resource ID. Particular links may be created or removed during a session, as desired.

At step 430, the system traps various events which are relevant to the established links. This operation, shown in further detail in FIG. 4B, occurs as follows. Every time that a message arrives at the message queue of a target application, a message filter hook function (WH_MsgFilter) 431 is called. First, the hook function determines if the message represents a task which has been "hooked," that is a specific link for this event of the target application has been created. If not, the event is passed down the hook chain for processing by one of the other hooks (i.e., hooks 433, 435, 437). The Windows hook 437, for example, traps all window messages (WM_). In this fashion, which hook function is invoked depends on what type of message comes into the target application. By way of illustration, hooks may be installed as follows:

```
BOOL installHooks(CbtEntry *pEntry)
{
    if( ! pEntry )
        return FALSE;
    // Note that the fourth parameter below may receive a task handle of
    // a target application, whereupon the hook is installed in that
    // application. When receiving a NULL parameter, the hook installs
    // to applications.
    // CBT hook -- allow CBT system to stop events from progressing
    hCBTHook =
        SetWindowsHookEx(WH_CBT, (HOOKPROC)cbtFilter, hInstance, NULL);
    // Msg filter hook -- dialog boxes and menus
    hMsgHook =
        SetWindowsHookEx(WH_MSGFILTER, (HOOKPROC)msgFilter,
            hInstance, NULL);
    // Get msg hook
    hGetMsgHook =
        SetWindowsHookEx(WH_GETMESSAGE, (HOOKPROC)getmsgFilter,
            hInstance, NULL);
    // Windows hook
    hCallWndProcHook =
        SetWindowsHookEx(WH_CALLWNDPROC, (HOOKPROC)callWndProcFilter,
            hInstance,NULL);
    return( hCBTHook && hMsgHook &&
        hCallWndProcHook && hGetMsgHook);
}
```

As shown, a callback function is installed for each hook; each callback function, in turn, serves as an entry point into an ATU. Additional information on the installation and use of hooks in Microsoft Windows can be found in the Microsoft Windows Software Development Kit referenced above.

In addition to installing hooks to trap system messages, one or more application-specific hooks (callback functions) 439 are installed as well. For instance, a target application may be a spreadsheet which includes its own internal set of messages, for example, SS_CELLSELECT, SS_CELLEDIT, SS_BLOCKDEFINE, and the like. To monitor these messages, an ATU may register an application-specific callback function with the target application, in effect dynamically binding the ATU to its target application. At runtime, the application invokes the callback function for dispatching internal or application-specific messages. Thus, the CBT system of the present invention is not limited to Windows events and their messages; instead, the CBT system may receive and translate any messages of interest, whether system-wide or strictly internal.

At step 440, events which are trapped by the Application Translation Units 340 are "dispatched" to the Message Engine 350 as CBT message/event information objects. As shown in particular detail in FIG. 4B, the dispatch module of each ATU includes a function corresponding to each Windows event. Thus, for the WM_COMMAND, WM_MENUSELECT, WM_BUTTONDOWN, and WM_SETCURSOR messages, the following translate functions may be defined:

int doWM_Command (CbtEntry *pEntry, MSG *msg);
    int doWM_MenuSelect(CbtEntry ,pEntry, MSG *msg);
    int doWM_ButtonDown(CbtEntry *pEntry, MSG *msg);
    int doWM_SetCursor (CbtEntry *pEntry, MSG *msg);

each designed for processing its particular event.

The operation of an ATU dispatcher will be demonstrated by the processing of Windows messages for determining if the cursor has traversed a window boundary (i.e., entered a new window); this example illustrates how a multitude of Windows WM_SETCURSOR messages can be converted into MOUSELEAVE and MOUSEENTER meta-messages. The dispatching of other events as CBT messages is set forth hereinbelow as Appendix A.

Figure 5A:
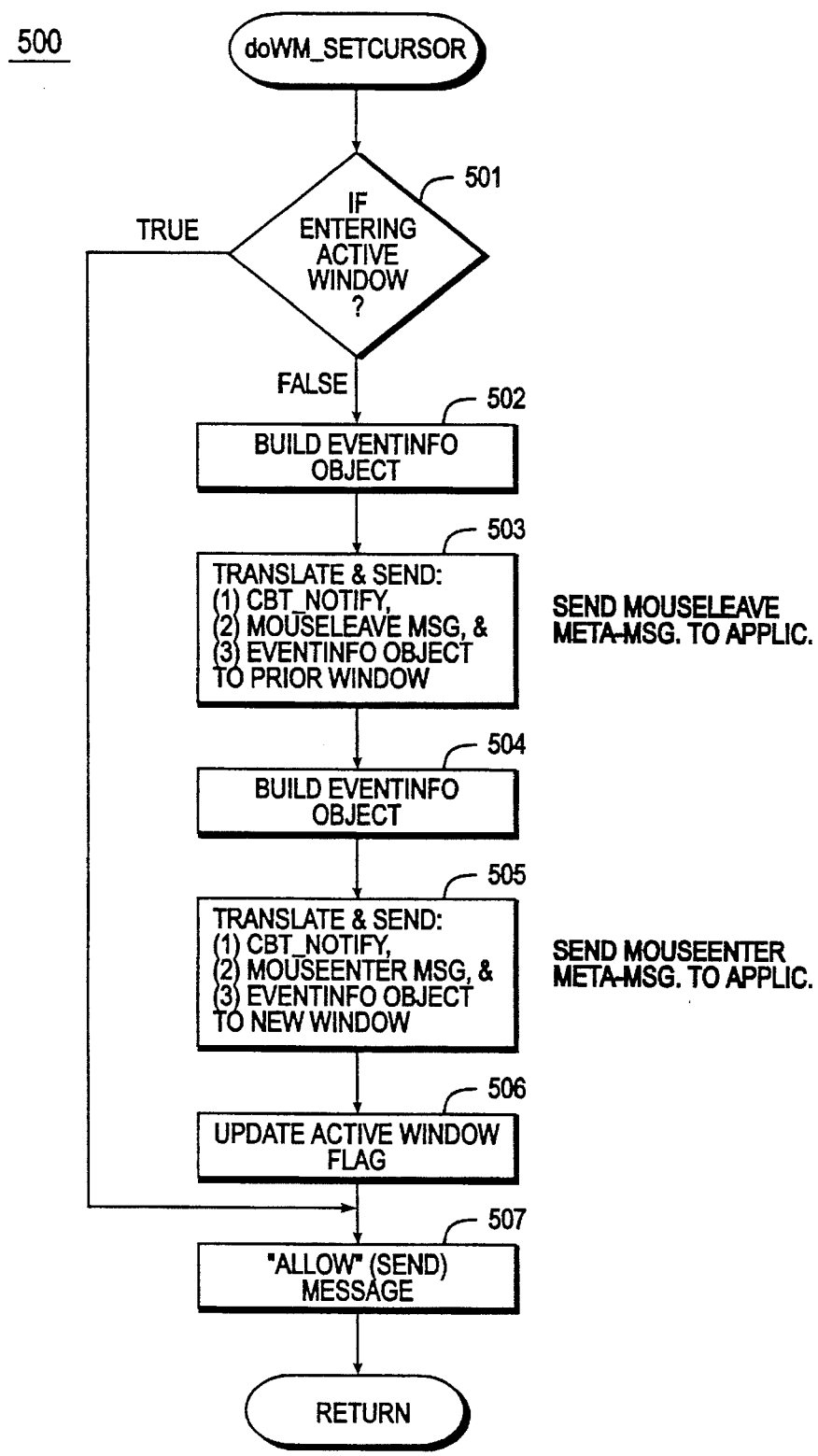
FIG. 5A is a flowchart illustrating the operation of an exemplary event handler of the present invention, which includes the dispatching of event information (EventInfo) objects.

As shown in FIG. 5A, a doWM_SetCursor dispatch method 500 is invoked whenever a SetCursor message is trapped by the ATU (i.e., captured by a hook function before the event has been received by the application). Here, the script writer is not interested in the screen cursor simply entering an already active window; thus, the method simply "allows" the Windows message to be passed to the target application at step 501 and returns. Specifically, since the screen cursor is entering a window which is already active, no particular CBT-generated message or other intervention is desired by the script writer at this point; hence, the WM_SETCURSOR message is allowed to pass through.

Continuing the example, the script writer may specify that the event of a cursor leaving an active window is of interest and should be trapped. Since the cursor is not simply re-entering the active window (no at step 501), the window which the cursor is leaving should be notified of the event. The CBT system notifies the Message Engine of this action as follows. First, at step 502, the information pertaining to the window where the event occurred is encapsulated into a C++ object (which is derived from an EventInfo class hierarchy, described in further detail hereinbelow). At step 503, the information object and a "MouseLeave" message are dispatched to the previous (departing from) window, with the message being denoted as a "NOTIFY" message.

In a preferred embodiment, two different classes of messages are provided: CBT_NOTIFY and CBT_CONFIRM. Those messages which are purely informational, such as mouse movements, are CBT_NOTIFY messages. Those which can be stopped before they reach the target application, on the other hand, are called CBT_CONFIRM messages. Each is registered with Windows as an application-specific Windows event. Using two methods defined within EventInfo objects, the script 320 can allow or prevent a CBT_CONFIRM type message from reaching the target application. Specifically, a stopMessage method is invoked which determines (based on script instructions) whether to allow the message to pass through to the target application.

After step 503, the method proceeds to alert the Message Engine that the cursor is entering a new window. In a manner similar to sending the "MouseLeave" message, the method first builds an EventInfo object at step 504. Next, a "MouseEnter" message of type CBT_NOTIFY is dispatched to the application, along with the information for the event (EventInfo object), at step 505. At step 506, an active window flag is set; this is the flag that is read in step 501 to determine if the mouse cursor is entering the active window. Finally, the method concludes by passing the message on to the application (i.e., "allow" message) at step 507. At the conclusion of the method, memory for the EventInfo objects may be recovered (e.g., using manual or automatic garbage collection techniques).

For purposes of illustration, one may implement such a method in the C++ programming language as follows:

```
int doWM_SetCursor(CbtEntry *pEntry, MSG *msg)
{
    EventInfo *pObject = (EventInfo *)NULL; // init EventInfo
    if( pEntry->hActiveWnd == (HWND)(msg->wParam) ) // steps 510/507
        return MSG_ALLOW;
    pObject = new WindowInfo( pEntry->hActiveWnd ); // step 502
    DispatchToCbt(pEntry, CBT_NOTIFY,
            TM_MOUSELEAVE, (LPARAM)pObject); // step 503
    pObject = new WindowInfo( (HWND)(msg->wParam) ); // step 504
    DispatchToCbt(pEntry, CBT_NOTIFY,
            TM_MOUSEENTER, (LPARAM)pObject); // step 505
    pEntry->hActiveWnd = (HWND)(msg->wParam); // step 506
    return MSG_ALLOW; // step 507
    // garbage collection performed by the system
}
```

Here, pEntry is a pointer to a record, CbtEntry, which is updated. The record includes handles to the hooked task (application that has been hooked) and the currently active window:

```
typedef struct _CbtEntry {
    HTASK hHookedTask;
    HWND hActiveWnd;
} CbtEntry; // pEntry points to this
```

As shown, a meta-message may maintain its own data structures for tracking events at a higher level (e.g., the status of the active window).

The DispatchToCbt function, on the other hand, is conveniently viewed as two halves of a process. Specifically, the Message Engine registers a callback function with the ATU. The operation proceeds as follows. On the ATU side, the ATU passes to the DispatchCBTMessage method a task handle for identifying a particular application; since the system processes multiple applications, this mechanism serves to distinguish between different applications (and their instances):

```
void DispatchToCbt(HTASK hHookedTask, UINT Msg, WPARAM wParam, LPARAM
lparam)
{
    if( pCbtDispatchFunc )
        (pCbtDispatchFunc)(hHookedTask, Msg, wParam, lparam);
}
```

In this manner, an ATU filters or groups events by target application and communicates its events as meta-messages to other CBT components. At the completion of step 440 of FIG. 4A, the ATU has dispatched the CBT message, its type, and the EventInfo object to the Message Engine 350, thereby fully communicating an event which it has trapped.

Not all events are of interest, however. Thus, the events should be filtered so that only those of interest are acted upon. At step 450, the Message Engine performs this task by comparing the CBT message against known event handlers. In other words, the engine attempts to dispatch CBT messages of interest—ones having a handler define for the event. Thus on the Message Engine side, the Message Engine determines which entry in its table corresponds to that task:

```
void CALLBACK MessageEngine::DispatchCBTMessage(HTASK hTarget, UINT
                                cbtmsg, WPARAM wParam, LPARAM lParam)
{
    CbtSession *pSession = GetSessionFromTask(hTarget);
    if( pSession )
        SendMessage(pSession->hMsgPane, CbtMessages[cbtmsg],
            wParam, lparam);
        // Notify application handler
        // where pSession is the current application session
        // (determined from hTarget);
        // CbtMessages[cbtmsg] is the table lookup for the
        // CBT message ("confirm" or "notify";
        // wParam is the CBT message type (TM__ msg); and
        // lParam is a pointer to the EventInfo object.
}
```

With particular reference to FIG. 4B, this process is illustrated. Message Engine filters CBT messages through a plurality of message handlers, including, for example, a TargetApplication handler 451, a TargetWindow handler 453, a Custom handler 455, and a Default handler 457; other exemplary handlers are set forth hereinbelow as Appendix B. CBT messages of interest will be passed to a particular handler. As shown in Appendix B, each message belongs to a particular Message Handler Class and is either informational (CBT_NOTIFY) or preventable (CBT_CONFIRM). A "mouseEnter" message, for example, belongs to a TargetWindow Handler Class; the message is therefore processed by the TargetWindow handler 453. An application specific event, such as an SS_EDITCELL message from a spreadsheet target application, on the other hand, would typically be passed to the TargetApplication handler 451. Finally, messages without a handler, that is, those which the script writer has no particular interest, may be passed to a default handler (e.g., for ignoring, discarding, or otherwise invoking a desired default action); thus, the script writer need only enumerate handler methods for messages of interest.

If matched with a handler, the message is then dispatched. Specifically, the handler extracts properties for the message and the accompanying EventInfo object. For a message of TargetWindow handler class, for instance, available object properties include:

1) Name: Title string of the control;

2) Class: Windows class of the control;

3) ID: Resource ID of the control;

4) Style: Style flags of the control;

5) Enable: Whether the control is enabled;

6) Position: Coordinates of the control; and

7) EventInfo: Current EventInfo object, if any.

Additional exemplary properties which are available for various messages handler classes are set forth hereinbelow as Appendix C.

As an alternative to defining several event handlers, a more preferred embodiment provides only two basic event handlers: an Application Link handler and a Window Link handler. Each is an object having various handler methods for appropriately responding to each message passed. Based on the lookup performed by the Message Engine (i.e., NOTIFY or CONFIRM), an Application Link handler may, for example, effect the dispatching as follows:

```
RESULT CALLBACK ApplicationLink::wndProc(HWND hwnd, UINT Message,
                            WPARAM wParam, LPARAM lparam)
{
    // First, get handler (from link registered)
    ApplicationLink *pWindow = (ApplicationLink *)GetWindowLong(hWnd, 0);
    if( pWindow )
    {
        if( Message == CBT_notify ) // Msg is a NOTIFY msg
        {
            EventInfo *pInfo = (EventInfo *)lParam;
            // Recall that Event info includes one or more of a win class,
            // name, and resource ID. If exact information is not provided
            // (e.g., just "OK" button), do "fuzzy" match (i.e., match as
            // much as possible:
            pWindow->doDispatchNotify(wParam, pInfo);
            pInfo->Finished( );
            return TRUE,
        }
        else if ( Message == CBT_confirm // Msg is a CONFIRM msg
        {
            EventInfo *pInfo = (EventInfo *)lParam; // Event info
            pWindow->doDispatchConfirm(wParam, pInfo);
            pInfo->Finished( );
            return TRUE,
        }
    }
    // on return, call WinProc instantiated w/ applic. link
```

-continued

```
        return DefWindowProc(hWnd, Message, wParam, lParam);
}
```

Here, the doDispatch- methods communicate directly with the Script Engine. In turn, the Script Engine responds according to script objects defined within the active script. By invoking the stopMessage method for specifying whether an event is allowed, for example, events may be stopped from reaching a target application; in most instances, however, the script writer will simply specify the default—that the event should simply pass on through to the target application.

The script writer may provide methods for handling the various events of interest, or he or she may rely on default methods which are defined by the CBT system. In operation, a CBT message is passed to the objects. Each object, in turn, is responsible (through its method definitions) for knowing which messages are of interest, and how each one of interest should be processed. In a target application, for example, if the script writer hooks a window link up to a list box of the application, he or she should provide methods for handling the event (as communicated by CBT messages) of that list box.

Figure 5B:
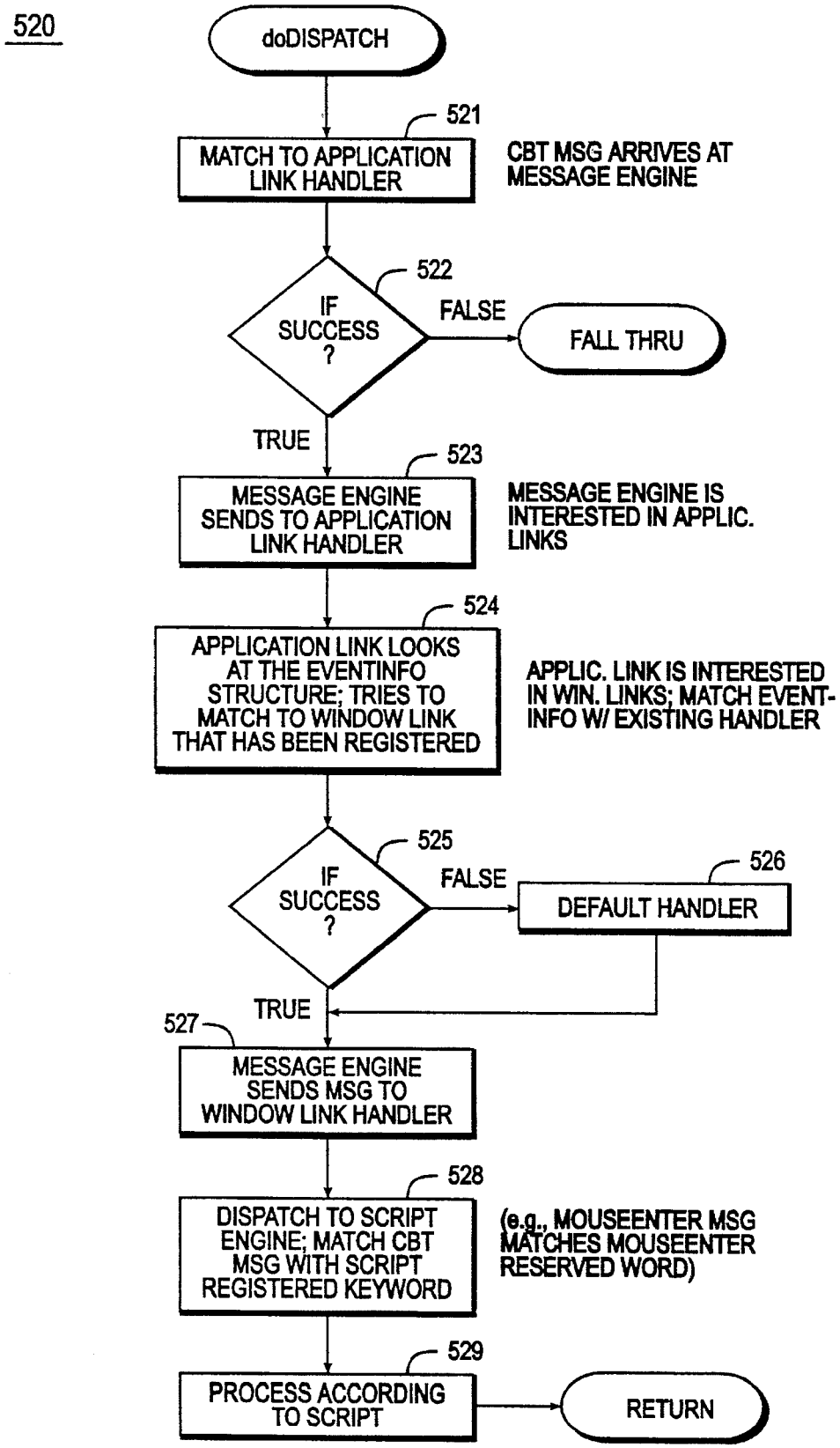
FIG. 5B is a flowchart illustrating a method of the present invention for dispatching meta-messages.

Referring now to FIG. 5B, the overall method of dispatching messages is summarized. In a doDISPATCH method 520 of the present invention, a CBT message arrives at the Message Engine and is processed as follows. First, in step 521, an attempt is made to match the message to an application link handler. If the attempt is unsuccessful (no at step 522), then the message is simply allowed to "fall through" (i.e., left unprocessed, or processed by a default handler). Otherwise (yes at step 522), at step 523 the Message Engine forwards the CBT message (with EventInfo object) to the identified Application Link handler.

At step 524, the Application Link handler examines the EventInfo object and attempts to match it with a registered window link. If this step is unsuccessful (no at step 525), then a Default handler will be assigned for processing the event at step 526. At step 527, the message is forwarded to the Window Link handler. The Window Link handler, in turn, dispatches the message to the Script Engine at step 528. At this point, the Script Engine identifies the event by mapping the message into its set of known reserved words. At step 529, the Script Engine processes the message according to the instructions of the script (i.e., effects the action desired by the script writer, as indicated by the use of the matching reserve word). Upon completion of this step, the method has successfully dispatched the meta-message, with appropriate actions being effected in response to that message.

2. Building CBT Lessons

As a tutorial is designed, the CBT script writer creates a "storyboard" showing the visual appearance as well as the flow of the tutorial. The storyboard becomes the basis for the CBT lesson script.

CBT scripts are written in a simple language which contains both message handling and object-oriented features. Each lesson script is organized as a collection of scenes, with each scene describing the actions that take place at a particular point in the lesson. For example, a scene might instruct the CBT system to display a window containing some text when a particular menu item is chosen in the target application. As the lesson script proceeds, new scenes can be performed. This process continues until the user chooses to exit the CBT or the lesson is finished.

To control the target application, the CBT system intercepts all Windows events for the application and translates them into CBT messages. These messages will trigger any corresponding message handlers which are defined within a scene. When a message handler is triggered, its script is executed.

Within each scene, message handlers are defined for each UI control in the application which is of interest. For example, to respond to a button click within the script the following handler is defined:

```
script for Scene1
    TargetButton theButton(120)
    on theButton.buttonClick
        theCBTLesson.perform("Scene2")
    end
end
```

This hypothetical scene creates a TargetButton object which is linked to the UI control in the target application; the UI control Resource ID is 120. Next, a Message Handler is defined for the buttonClick message from the TargetButton object. When this message is received, the Script Engine performs a new scene, Scene2. Thus, the statement:

theCBTLesson.perform("Scene2")

calls the perform method of the global object "theCBTLesson" (the CBT Lesson object).

In addition to controlling user actions, the CBT lesson also drives the target application autonomously by sending appropriate messages. Alternatively a sequence of events can be recorded (e.g., using a tool similar to MS-Windows Recorder) for later replay.

The script may also query the target application for its current properties. If a window link is established to a button, for instance, the script may query the button for its properties, such as its size, its title, and the like. One should note that the ability to query for properties operates independently of the processing of events and their messages. As another example, a target application could be asked to enumerate all the buttons of a dialog box. The script may, in turn, act on the queried information, including modifying selected resources. In this fashion, the resources of a target application may be dynamically varied, thereby providing the target application with an alternative user interface—one having UI components which may be altered on the fly.

Appended herewith as Appendix D is a source listing illustrating an exemplary script syntax and methodology for operating the CBT system of the present invention. Additional reference materials illustrating a preferred script syntax are appended herewith as Appendix F.

3. Multiple-application Lessons

As shown by FIG. 3, the system of the present invention is operative with one or more applications 360. More particularly, according to the present invention, a single script 320 may be employed to not only control multiple applications concurrently, but also control interaction between multiple applications. A script may be provided for tutoring the user in the operation of cutting and pasting between applications, for instance, cutting text from a word processor and pasting it into a database application. Thus, the CBT system 130 is not application bound; instead, it is a complete subsystem—one which may control multiple applications, including interactions between applications and/or the operating system, even launching additional applications as needed.

4. Event Information (EventInfo) Objects

Figure 5C:
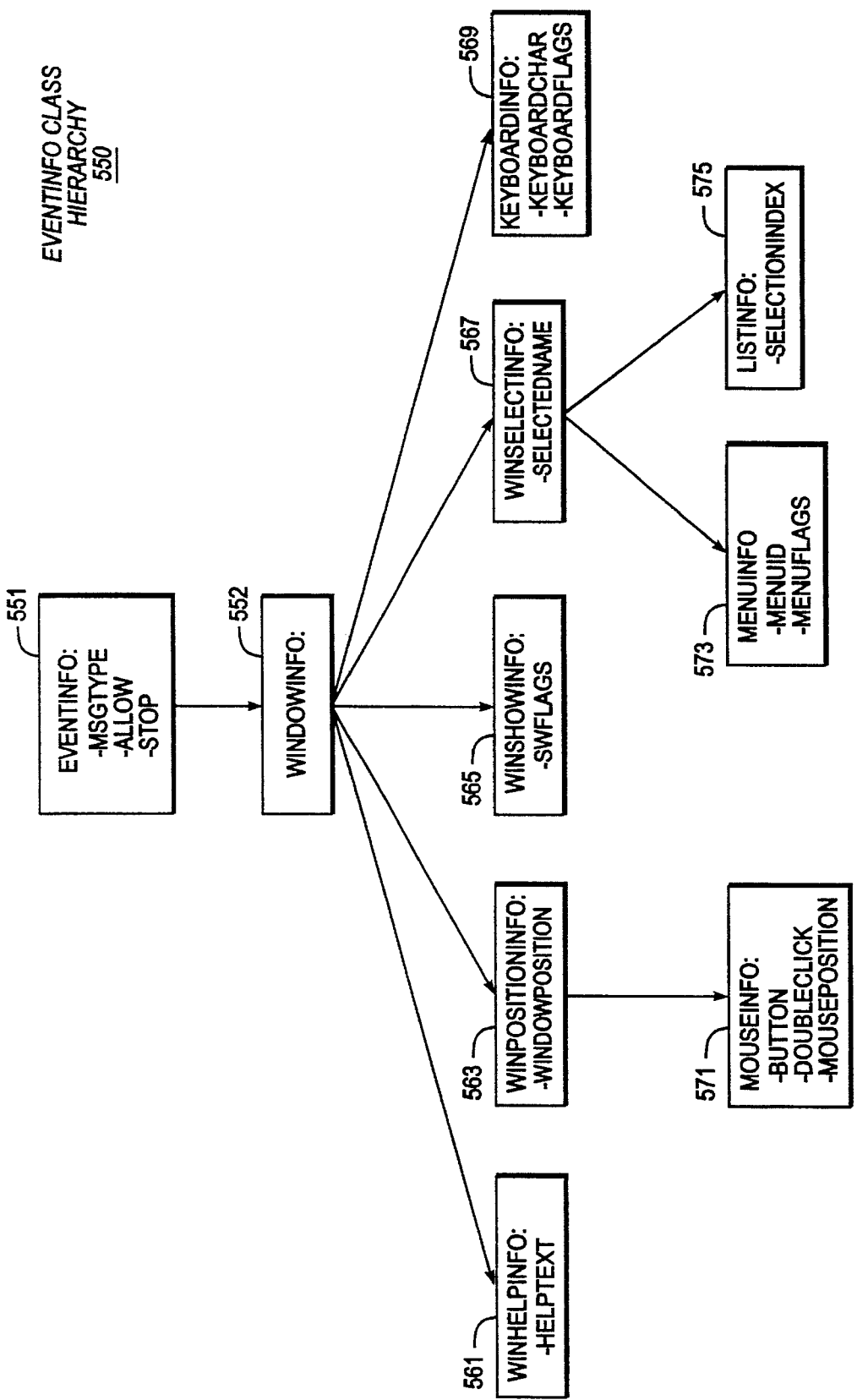
FIG. 5C is a class hierarchy diagram illustrating the underlying structure for the EventInfo objects of FIG. 5A.

An EventInfo object, which stores information about a particular event, is instantiated from an EventInfo class 550. FIG. 5C illustrates the EventInfo inheritance tree and lists the properties for each class. As shown, the EventInfo class hierarchy 550 includes nine derived EventInfo classes which contain the state information about the various standard CBT messages. At the root of the hierarchy is the EventInfo base class 551. In a preferred embodiment, this class may be constructed with the following C++ class definition:

```
class SHARED_CLASS EventInfo : public CbtObject,
                               public pEventInfo {
public:
    ATOMTABLES(Keyword, 7)
protected:
    HWND    hwndTarget;
    BOOL    bAllowMsg;
    BOOL    bIsProcessing;
public:
                         EventInfo(HWND hwnd);
    virtual              ~EventInfo( );
    virtual    int       Supports(hProtocol &Hdl) const;
    inline     HWND      WindowHandle( ) const;
    virtual    const char *  WindowName( ) const = 0;
    virtual    const char *  WindowClass( ) const = 0;
    virtual    int       WindowId( ) const = 0;
    virtual    LONG      WindowStyle( ) const = 0;
    virtual    BOOL      AllowMessage(BOOL bFlag, BOOL
                                      bState);
    virtual    BOOL      ProcessingMsg( ) const;
    virtual    void      Finished( );
    inline     void *    operator new(unsigned size);
    inline     void      operator delete(void *p);
    ATOMMETHODS(Keyword)
    CLASSMETHODS(EventInfo, "EVENTINFO")
};
```

As shown, the EventInfo class 551 provides access to the Windows name and its class, its resource ID, its Windows style, and whether the message is allowed (according to the script 320).

Derived from EventInfo class 551 is WindowInfo class 552, a pure virtual base class for other EventInfo classes. The subclass affords the same four pieces of information which were provided by the base class 551. In addition, for a given window handle, the object will extract a window name, class, ID, and style. The class may be constructed with the following C++ class definition:

```
class SHARED_CLASS WindowInfo : public EventInfo {
protected:
    int     iWindowId;
    LONG    lWindowStyle;
    char *  strWindowName;
    char *  strWindowClass;
public:
                         Windowinfo(HWND hWnd);
    virtual              ~WindowInfo( );
    virtual    int       Supports(hProtocol &Hdl) const;
    virtual    const char *  WindowName( ) const;
    virtual    const char *  WindowClass( ) const;
    virtual    int       WindowId( ) const;
    virtual    LONG      WindowStyle( ) const;
    CLASSMETHODS(WindowInfo, "WINDOWINFO")
```

*-continued*

```
};
```

In addition to the windowing information, other events are also of interest, particularly mouse and keyboard events. These other events are accessible through subclasses of WindowInfo class 552. Specifically, the WindowInfo class spawns five subclasses: WinHelpInfo class 561, WinPositionInfo class 563, WinShowInfo class 565, WinSelectInfo class 567, and KeyboardInfo class 569. As shown, objects may be instantiated from these subclasses for accessing help text, window position, menu information, keyboard events, and the like. WinHelpInfo, for instance, contains the text which was sent by the WinHelp engine to the CBT. This text can be a sequence of script statements which are executed or simply a string of text. WinPosition provides the coordinates of the window. WinShowInfo contains the SWP_flags corresponding to the Windows ShowWindow() function. WinSelectInfo contains the name of the selected menu or control window item. KeyboardInfo contains the key that was pressed as well as any flags indicating if the <ALT>, <SHIFT>, or <CTRL> keys were also pressed.

Two classes, WinPositionInfo class 563 and WinSelectInfo class 567, spawn additional subclasses. As shown, MouseInfo class 571, which is derived from WinPositionInfo class 563, provides direct access to mouse events; it contains the mouse button that was clicked and whether it was a single or double click as well as the position of the mouse. WinSelectInfo class 567, on the other hand, spawns MenuInfo class 573 and ListInfo class 575. The former provides access to menu IDs and menu flags, the flags indicating whether the menu item is grayed, highlighted, or the like; the latter provides the index of the selected item, which is important if the list does not contain text.

Second embodiment: Computer-aided Software Testing System

A. Introduction

An alternative embodiment of the present invention, one adapted for automated testing of GUI applications, will now be presented. Before discussing the construction and operation of the computer-aided software testing embodiment in detail, it is helpful at the outset to briefly review parameters for quantifying the effectiveness of software testing.

By automating the tasks of "controlling" and "observing" the target software, the burden of testing for the QA engineer is substantially reduced. In other words, the more successfully the QA engineer can control and observe the software program, the more effective the test becomes to automate. This can be restated as a formula:

Test Automation Effectiveness=%Controllability X %Observability where Controllability is a rough measure of how effectively the program can be automatically controlled into a given state, and Observability is the measure of how effectively a bug can be automatically observed when the program being tested is in a faulty state. Test Automation Effectiveness is the product of these two factors for the program under examination.

Consider, for example, the task of testing a software compiler having both command-line and GUI components (such as found in commercially-available compilers from Borland and Microsoft). Conceptually, testing the GUI portion of the compiler should be easier than testing the command-line portion, owing to the latter's complex internal operations. In practice, however, it is far easier to test the command-line portion. The QA engineer need only develop test programs or data files that are run through the compiler using a simple batch file. Here, it is easy to achieve total control for the non-GUI portion. Observability is also high because return values or variables denoting the state of the compiler can be tested and written to a file using simple program statements that print the results.

The task of automating the control of a GUI program, in contrast, is particularly difficult. Specifically, the task of maintaining pre-recorded input (i.e., keyboard and mouse actions) and test scripts is not only very time consuming but also prone to error. If the degree of controllability and observability of the automated tests can be increased, the task of testing GUI software may be made easier.

According to the present invention, the QA engineer constructs a high-level model of an application's UI using prefabricated building blocks. This high-level model serves as a middle ground between test scripts and the application being tested. The knowledge of how a given UI element is controlled or how it can be observed is retained in the model rather than in a test script. Consequently, the test script consists of easy-to-maintain, high-level testing commands only. For instance, an exemplary script for opening a particular file (e.g., "test1.txt") may be defined as follows:

| | |
|---|---|
| TheApp.FileMenu.Open.Select( ) | // Select File ¦ open menu |
| // ActiveDialog now represents the File Open dialog | |
| ActiveDialog.Filename.Set("test1.txt") | // Type in the file name |
| ActiveDialog.OK.Click( ) | // Click on the OK button |

One need only include high-level statements defining the operation, such as shown above.

B. System overview

Figure 6:
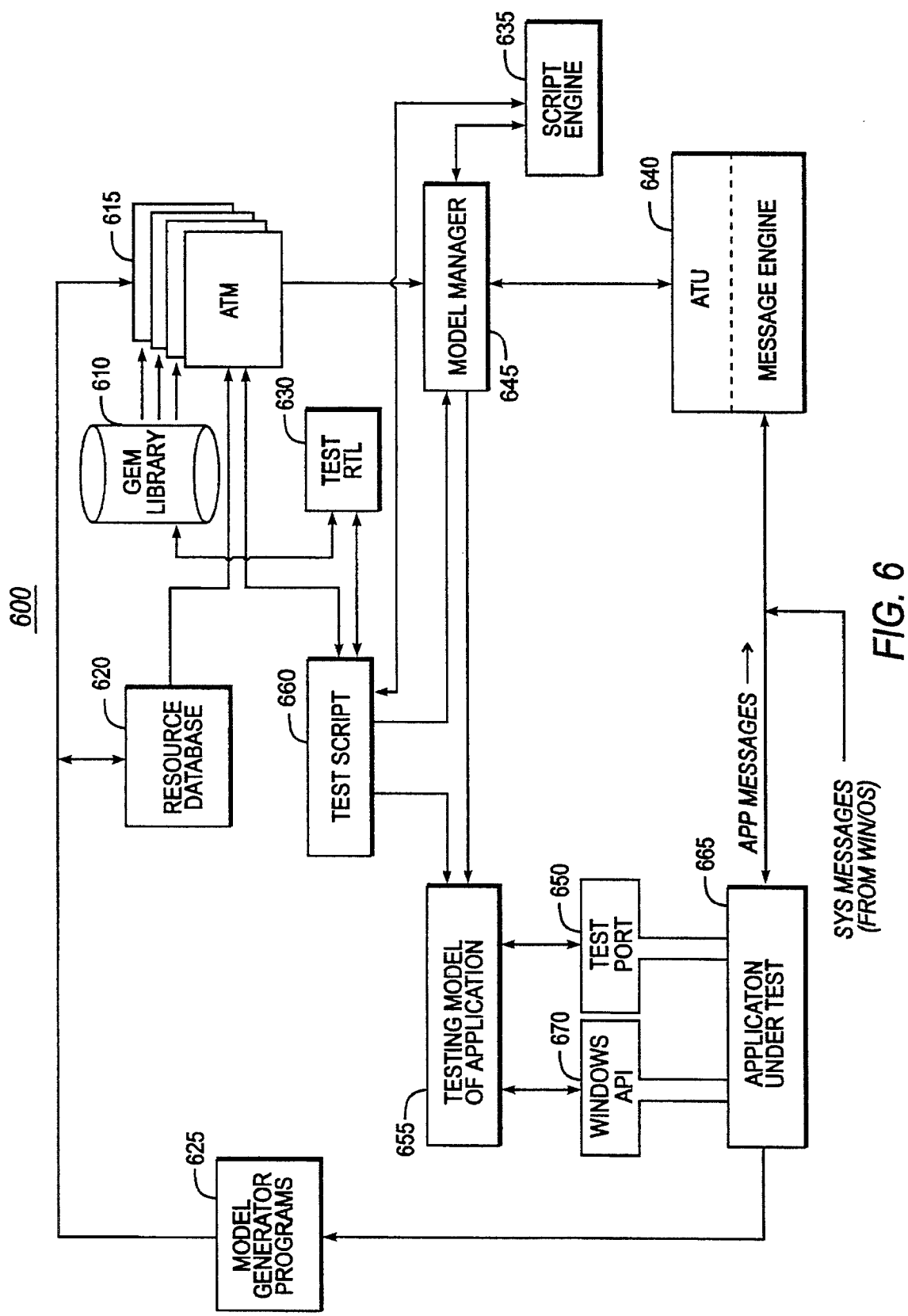
FIG. 6 is a block diagram of a computer-aided software testing system of the present invention.

Referring to FIG. 6, a software testing automation system 600 of the present invention includes Generic Element Models (GEMs) library 610, Application-specific Testing Models (ATMs) 615, Resource Database 620, one or more Model Generators 625, Test Runtime Library 630 (for storing Test Objects or Test Functions, typically as one or more Dynamic Link Libraries (DLLs)), Script (interpreter) Engine 635, Message Engine with one or more Application Translation Units (ATUs) 640, and an in-memory Testing Model 655 (of the application under test), and one or more test scripts 660.

Communication directly with the application under test 665 is effected through Windows API 670 and/or Test Port 650. Using Windows API 670, various Windows messages may be sent or posted to the application for querying the application or effecting particular operations, as is known in the art. For instance, one may determine at runtime whether a checkbox screen object is checked (i.e., toggled to its "Checked" stated) by invoking the standard Windows API call:

IsDlgButtonChecked (hwndDlg, idButton)

where, hwndDlg is the handle of dialog box and idButton is the identifier of the button/checkbox. Documentation for the Windows API is provided in the Microsoft Windows Software Development Kit (SDK), available directly from Microsoft (and several other vendors). In addition to communication with the application under test 665 through the Windows API, application-specific messages may be registered with the Windows OS, as is known in the art. Test port 650 represents the use of such application-specific messages for communicating with the application under test 665.

In general operation, the system employs the Model Generator 625 to decompose the application under test 665 to generate the Application-specific Testing Models (ATMs) 615. Each ATM is a high-level model for a specific component of the application being tested, such as a File Open dialog. ATMs describe the actual component which they represent in terms of Generic Element Models (stored in GEMs Library 610), which will now be introduced.

A GEM encapsulates the behavior of irreducible user interface elements such as push buttons, checkboxes, listboxes, and the like. GEMs are instantiated when an ATM corresponding to an active state of the application under test is activated by the Model Manager 645. GEMs load their expected results from the Resource Database 620 and are capable of binding themselves dynamically to the actual object on the screen which they represent. Each GEM therefore can perform a "self test" on itself by simply comparing its expected result (as stored in the Resource Database 620) to its actual behavior (as displayed on the screen at runtime). In this manner, an entire application can perform a self test by simply asking all its components to test themselves in turn.

Driven by a test script 660, the Testing Model 655 of the application under test 665 employs both Windows APIs 670 and/or the Test Port 650 to control the application being tested into various states; in each state, the results generated may be observed for error. The Model Manager 645 monitors the state of the application under test using the Message Engine and Application Translation Units (ATUs) 640 (components which are the same as those described above for the first embodiment). ATUs translate low-level messages into high-level messages, dispatching those events that the Model Manager 645 has registered an interest in. Driven by the changes in the state of the application under test 665 and/or events occurring in the system, the Model Manager 645 instructs the Script Engine 635 to load and execute the appropriate ATM 615 which corresponds to the active state of the application under test. The test script 660 employs the Test Library 630 and the Testing Model of the Application 655 to carry out the test execution task. The construction and operation of the system components will now be described in detail.

C. Application-specific Testing Models

Application-specific Testing Models (ATMs) provide high-level representation for specific components of the application under test. An ATM for a File Open dialog, for instance, describes the actual dialog in terms of the fundamental, pre-constructed building blocks which it comprises. In this manner, an entire application can be described using a library of ATMs.

In a preferred embodiment, at least five categories of ATMs are automatically provided by the system: Menus, ToolBars, Dialogs, Client Area Windows, and a Status Line. Each of these categories corresponds to a base class pre-supplied with the system. Each base class encapsulates functionality associated with its category. A menu base class, for instance, includes data members for describing menus and methods operative on those data members. The base classes simplify the Model Generator's task of creating ATMs. Moreover, the base classes allow the QA engineer or software developer to construct custom ATMs by simply deriving specific instances of the pre-supplied base classes.

Consider, for instance, an application having a File Open dialog. An ATM representing such a dialog may be created by deriving a FileOpenDlg class from the pre-existing base class for dialogs. The pre-supplied base class for dialogs ("BaseDlg" class) already encapsulates the behavior and properties of a generic dialog box. Thus, the task of modeling a File Open dialog is greatly simplified. In a like manner, other aspects of the application may be modeled using the base classes which are provided for the other categories. For instance, the application's menu and client area may be modeled using pre-supplied BaseMenu and BaseClientArea classes, respectively.

Figure 7A:
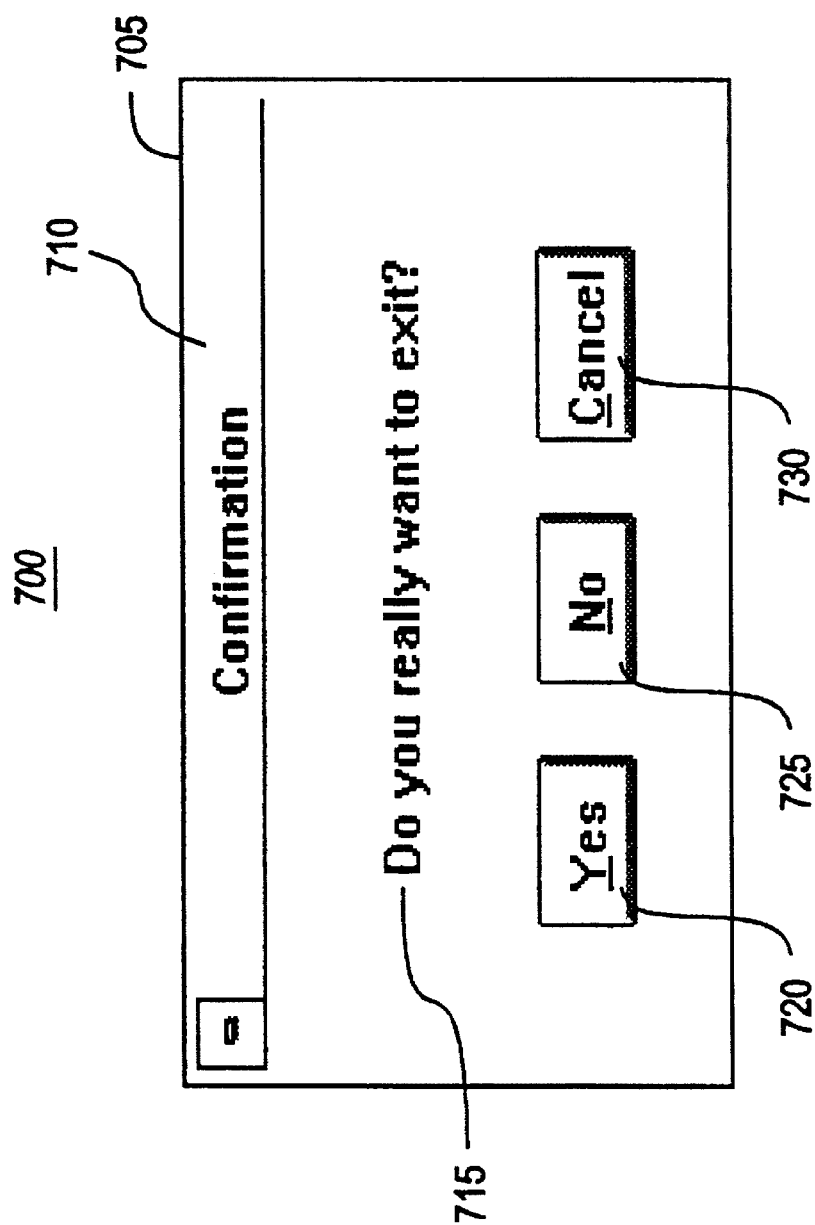
FIG. 7A is a bitmap screenshot illustrating a screen dialog object (box), which includes children components (e.g., screen buttons).

Before describing ATMs in further detail, it is helpful to review runtime construction of screen objects, such as dialog boxes in Microsoft Windows. Consider a typical dialog, such as confirmation message box dialog 700 shown in FIG. 7A. The dialog 700 comprises a screen window 705 which includes a plurality of elements, including caption bar 710, static text 715, and buttons 720, 725, 730. Each of these "children" may, in turn, include still further elements. Button 720, for instance, includes a caption text or label: "Yes".

Figure 7B:
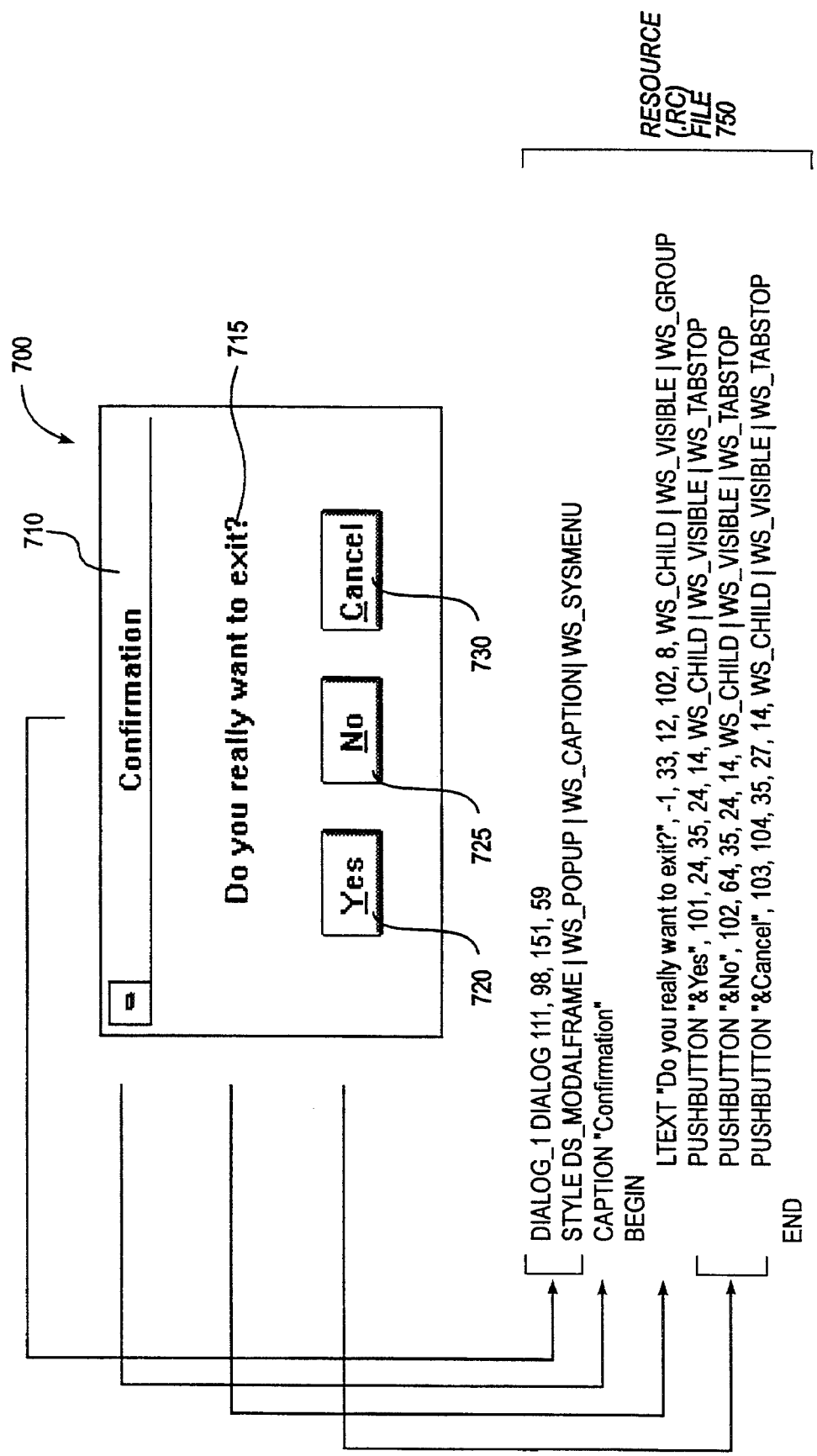
FIG. 7B illustrates the relationship between the dialog of FIG. 7A and underlying resource information (which originally had been provided by the programmer creating the application).

FIG. 7B shows the resource or programming statements attendant to the creation of each element of dialog 700 (e.g., in Microsoft Windows). The first line of resource file 750, for instance, defines a DIALOG screen element, named DIALOG_1 (identifier), and includes screen coordinates (111, 98, 151, 59) specifying a starting location and size (ending location). The second line specifies various window attributes or "window styles" that the dialog 700 is to assume. Dialog 700, for instance, is to be a "popup" window (Microsoft window style=WS_POPUP) with a caption bar (Microsoft window style=WS_CAPTION) and a system menu (Microsoft window style=WS_SYSMENU). A caption statement (CAPTION "Confirmation") specifies that the text "Confirmation" is to be displayed in the caption bar 710.

Also shown in the resource script are the children screen elements of the dialog 700. Specifically, the static text 715 is defined by the LTEXT statement, while buttons 720, 725, 730 are defined by PUSHBUTTON statements. The definitional statement for each of these includes information similar to that of the parent dialog window—namely, a caption or label, an identifier (resource identifier), a starting location and size, and window styles. Button 710, for instance, is defined by a resource statement having a caption of "&Yes" (& tells Windows to underline the immediately following character), an identifier of 101, screen coordinates of 24, 35, 24, 14, and window style of WS_CHILD (child window), WS_VISIBLE (visible), and WS_TABSTOP (tab stop for setting input focus to this element with tab key).

The foregoing relationship between resource (.RC) script files and screen objects is well known in the field of Windows programming. For those readers unfamiliar with these concepts (i.e., non-Windows programmers), it is strongly suggested that the following references be consulted: Petzold, C., Programming Windows (particularly, Section III: Using Resources); Borland C++: Resource Workshop; and Microsoft Windows Software Development Kit/Microsoft Visual C++.

Figure 7C:
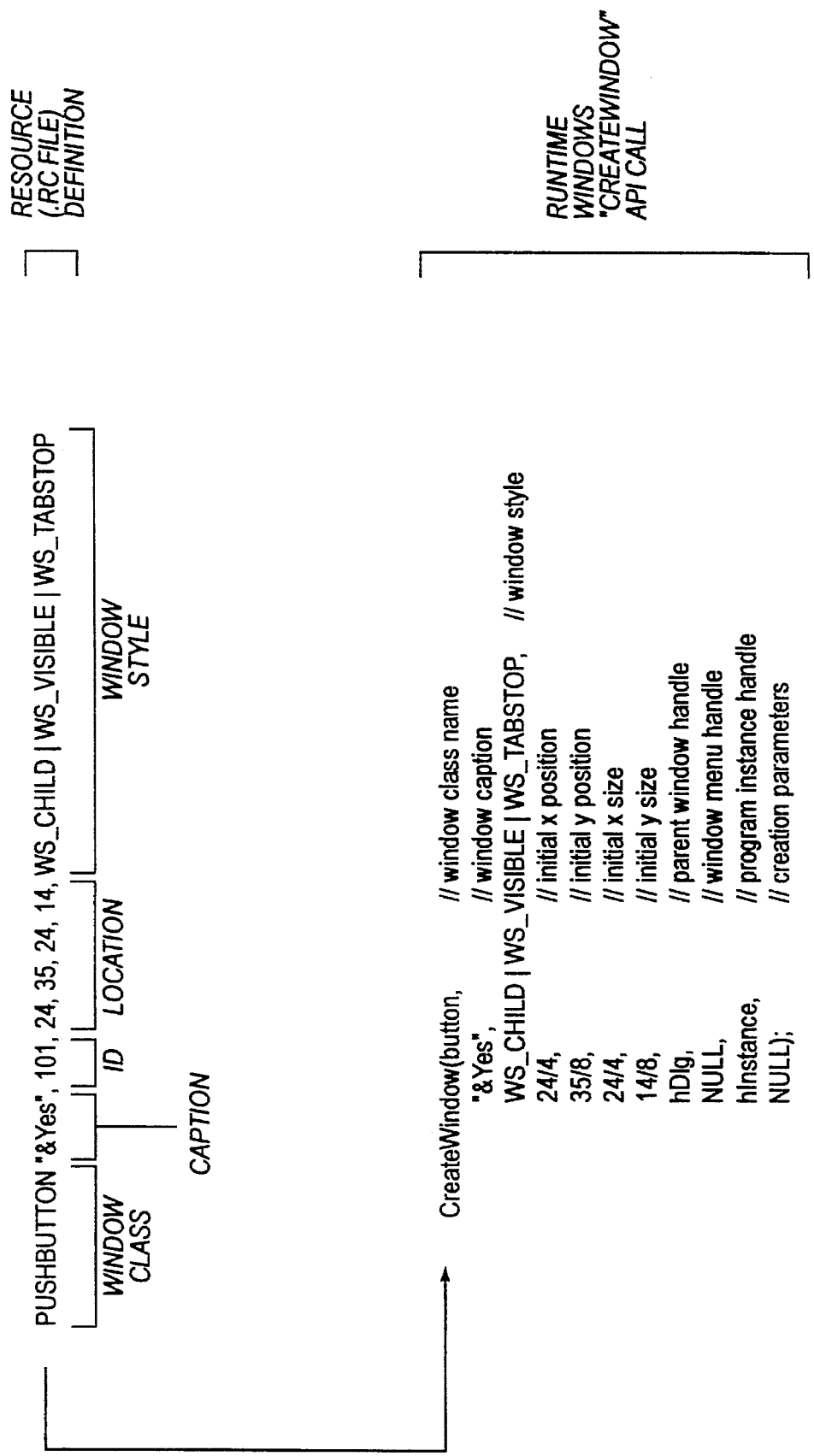
FIG. 7C is a diagram illustrating the relationship between resource information (represented in Microsoft Windows resource format) and the runtime API Windows call (CreateWindow).

FIG. 7C illustrates that resource statements in a resource file are at runtime actually translated into Windows API calls. In particular, a given resource is created at runtime by calling Windows CreateWindow function, with the aforementioned attributes passed to Windows as parameters. CreateWindow is a standard Windows API call (and is therefore fully documented in the Petzold and Microsoft materials, as well as numerous other references). The "Yes" button 720, for instance, is created by the following CreateWindow call:

| CreateWindow ( | button, | // window class name |
| | "&Yes", | // window caption |
| | WS_CHILD \| WS_VISIBLE \| WS_TABSTOP, | // window style |
| | 247cxchar,4, | // initial x position |
| | 351cyChar*8, | // initial y position |
| | 241cxChar*4, | // initial x size |
| | 141cyChar*8, | // initial y size |
| | hDlg, | // parent window handle |
| | NULL, | // window menu handle |
| | hInstance, | // Program instance handle |
| | NULL | // creation parameters |
| ); | | |

At runtime, therefore, the Message Engine may trap each CreateWindow API call for determining each screen object which is about to be created.

Using known techniques, the Model Generator 625 may decompose the resources of an application to automatically construct a model specific for the application—the Application-specific Testing Model or ATM. Known techniques include reading Windows resource information. Since resources may change dynamically at runtime (e.g., menu item becoming "grayed out"), it is more preferable to dynamically poll resources at runtime. Thus in a preferred embodiment, the resource information is learned dynamically— t the application's runtime—using Windows API (calls) 670, or Test Port 650 (in the instance of a proprietary control object). Exemplary calls are provided below (with reference to the Notepad example of FIGS. 8 and 9). Once the application's resources are learned, the Model Generator proceeds to construct each ATM by declaring the individual resources in a class definition derived from BaseDlg—the generic dialog class which encapsulates all the properties and functionality found in an empty dialog box.

In an exemplary embodiment, BaseDlg may be constructed from the following class definition:

```
// BaseDlg class definition
class BaseDlg( )
    //Begin Constructor
    Moniker = 0 //Live link to the actual dialog on the screen
    Id = 0 //Unique id used as index to fetch expected
             //values for this dialog from the resource dbase
    Caption = 0 //Dialog's expected caption
    ParentName = 0 //Parent Window's Caption or Name
    Style = 0 //This dialog's style
    Dimension = 0 //Coordinates and size
```

```
Children = 0  //Reference to the components of this dialog
NumOfKids = 0  //Number of components in this dialog
ParentPtr = 0  //Reference to application which owns this dialog
//End constructor
function Init( Cl, Cap, App, ResId )  // Class, Caption, Application
                                       // reference and Unique Id
    //Establish a live link to the actual dialog on the screen
    //by instantiating a WindowProxy object called "Moniker"
    WindowProxy Moniker("", Cl, Cap )
    //Set ParentPtr and Id
    ParentPtr = App
    Id = ResId
    //Fetch expected values from the resource database
    //using the "Id" key
    Defaults.LoadData( Id, Caption, ParentName, Style, Dimension
    //Bind each component to the corresponding element on the screen
    i = 0
    while ( i < NumOfKids )
        Child = Children [ i ]
        Child.Bind( )  //See BaseGem's Binds member function
        i + 1
    end
end
function DetachChildren( )
    // Detach from the actual dialog on the screen
    i = 0
    while ( i < NumOfKids )
        Child = Children[ i ]
        Child.Detach( )
        i = i + 1
    end
    Monker = 0
end
function SelfTest( )
    //Bist or Built-in-self-test controls verification and logs
    //messages to the appropriate file in a specified format
    Bist.Start( "Dialog selftest", Id )
    Bist.Verify( "Caption", Caption, Moniker.Caption )
    Bist.Verify( "Parent", ParentName, ParentPtr.Moniker.Caption )
    Bist.Verify( "Size", Dimension, Moniker.GetSize( ) )
    Bist.Verify( "Style", Style, Moniker.GetStyle( ) )
    Bist.Verify( "Children",NumOfKids, Moniker.GetNumOfKids( ) )
    //Instruct each component of the dialog to test itself
    i = 0
    while ( i < NumOfKids )
        Child = Children[ i ]
        Child.SelfTest( )  //Each Child has a SelfTest( )
                           //member function
        i = i + 1
    end
    Bist.EndSection( )
end
// Capture attributes of this dialog and its children
function Capture( )
        // . . . place holder for custom code; insert as desired
end
// Move window X pixels horizontally and Y pixels vertically
function Move( X, Y )
        // . . . place holder for custom code; insert as desired
end
// Size window X pixels horizontally and Y pixels vertically by
// stretching the bottom-right corner.
function Size( X, Y )
        // . . . place holder for custom code; insert as desired
    end
end
```

As shown, BaseDlg includes a Moniker data member. Moniker is a live link to the actual (corresponding) object on the screen. The link is created by calling WindowProxy, a C++ class which encapsulates Windows information for the object. In an exemplary embodiment, WindowProxy includes the following C++ class constructor:

```
WindowProxy::WindowProxy(const char *strTask,
```

```
                    const char *strClass,
                    const char *strTitle)
{
    strWindowName = (char *)new char[MAX_WINDOW_NAME + 1];
    strWindowClass = (char *)new char[MAX_WINDOW_NAME + 1];
    strTaskName = (char *)new char[MAX_WINDOW_NAME + 1];
    *strWindowClass = *strWindowName = *strTaskName = '\0';
    if( strTask )
        STRCPY(strTaskName, strTask);
    hTargetTask = getTaskHandle(strTask);
    hWndTarget = FindWindow(strClass, strTitle);
    BindToWindow(hWndTarget);
}
```

The constuctor includes a call to a BindToWindow method, which may be constructed as follows:

```
BOOL WindowProxy::BindToWindow(HWND hWnd)
{
    BOOL bStatus;
    if( hWnd && iWindow(hWnd) )
    {
        GetWindowText( hWnd, strWindowName, MAX_WINDOW_NAME );
        GetClassName ( hWnd, strWindowClass, MAX_WINDOW_NAME );
        iWindowId = GetWindowWord(hWnd, GWW_ID);
        lWindowStyle = GetWindowLong(hWnd, GWL_STYLE);
        hWndTarget = hWnd;
        bStatus = TRUE;
    }
    else
    {
        *strWindowName = *strWindowClass = '\0';
        iWindowId = 0;
        lWindowStyle = 0L;
        hWndTarget = (HWND)NULL;
        bStatus = FALSE;
    }
    hCurrItem = (HWND)NULL;
    return bStatus;
}
```

As shown, WindowProxy's constructor encapsulates Windows handle, task handle, caption, and the like for the object. In the event that the object is not a Windows control (e.g., it is a spreadsheet or other implementation-specific object), the information may be nevertheless encapsulated (as shown by the above "else" clause of BindToWindow). Other exemplary method prototypes of WindowProxy are set forth hereinbelow in Appendix E.

Regardless of how it is implemented, the Moniker, once created, is an encapsulation of the actual object on the screen. The properties of the Moniker fully describe the corresponding object on the screen, thus giving a live link to the actual screen object. The Resource Database, on the other hand, stores expected data for the object. The two may be compared against each other (e.g., during SelfTest) for detecting runtime errors, as well as modeling problems.

In addition to the Moniker, the BaseDlg class includes two other data members: Children—a reference to the components of the dialog, and NumOfKids—number of components (kids) in the dialog. These are employed in the SelfTest method of BaseDlg.

```
function SelfTest( )
    i = 0 // init to first kid
    while ( i < NumOfKids )
        Child = Children[ i ] // test this kid
        Child.SelfTest( )
        i = i + 1 // increment to next kid
    end
end
```

As shown, this allows a dialog object to test itself by asking its children to, in turn, test themselves (by calling their self test methods—Child. SelfTest()).

Moreover, SelfTest may include various levels of testing—each level denoting more extensive testing. For instance, maximum (all levels) testing may be performed by:

```
function SelfTest( MaxLevels )
    i = 0
    iLevel = 0
    while ( iLevel < MaxLevels ) // step through all levels
        while ( i < NumOfKids )
            Child = Children[ i ]
            Child.SelfTest( iLevel )
            i = i + 1
        end
        iLevel = iLevel + 1 // increment to next level
```

-continued

```
end
```

In contrast, more expedient (but less thorough), high-level testing may be performed by:

```
function SelfTest( iLevel )
    i = 0
    while ( i < NumOfKids )
        Child = Children[ i ]
        Child.SelfTest( iLevel ) // just test single level
        i = i + 1
    end
end
```

During creation of the dialog at runtime, the Message Engine traps the CreateWindow message for the dialog of interest (which the Model Manager has registered an interest in). In this manner, the Model Manager 645 receives notification from the Message Engine 640 that the dialog is about to be created. Upon receipt of the notification, the Model Manager locates an existing model of the dialog. If a model is found, the system is instructed to load the dialog and execute it, whereupon the Init() method of the BaseDlg class is invoked. Init initializes the Moniker, thereby creating the live link to the actual dialog. Also during Init (as shown above), the children are asked to bind themselves to their corresponding screen objects. If one of the children is a checkbox, for instance, it becomes bound to the actual checkbox on the screen.

The opposite of Init is Detach. Upon the Model Manager's receipt of a message that the dialog is about to be removed from the screen (upon occurrence of a DestroyWindow message for the dialog), the Detach method is invoked for freeing memory allocated for the BaseDlg instance which had been created. The Moniker for the dialog is also freed (set to 0).

This process will be illustrated for the confirmation message box dialog 700. For the dialog 700, a model may be constructed from the following class definition, derived from BaseDlg:

```
class ConfirmationDlg of BaseDlg
    Button      Oui       ( Self, 101 )    // line 2
    Button      No        ( Self, 102 )
    Button      Cancel    ( Self, 103 )
    Static      TheText   ( Self, -1 )     // line 5
    NumOfKids = 4
    // Component array
    Components = [ NumOfKids ]
    Components[ 0 ] = Oui
    Components[ 1 ] = No
    Components[ 2 ] = Cancel
    components[ 3 ] = Text
    Children = Components
end
```

The first line declares a class, ConfirmationDlg, which is derived from BaseDlg, the existing class. As shown above, each ATM includes a component array containing all its elements. The member functions of the BaseDlg class manipulate these components once they have been constructed. ConfirmationDlg inherits the data members and member functions of BaseDlg and instantiates the list of elements for FIG. 7A, as shown in lines 2 to 5 above. Oui, No, and Cancel represent objects within the confirmation dialog 700 which are instances of a Generic Element Model (GEM) of type Button.

In an exemplary embodiment, each GEM (described in detail below) takes two parameters to construct itself: a reference to the parent dialog (Self) and a unique identifier (either its pre-existing resource id, or one derived by the system). In the present example, the Yes button 710 on the message box 700 has been represented by an identifier called Oui in order to emphasize that there are no assumptions about textual information made in the ATM. The object Oui loads its expected label text (the text string "Yes") from the Resource Database during initialization time. Consequently, the ATM above can represent different language versions of the Confirmation dialog without any modifications. The language difference is encapsulated in the Resource Database (described below) which is generated automatically.

As shown above, ConfirmationDlg itself is a class definition. To use ConfirmationDlg at runtime, an instance is created. In an exemplary operation of the preferred embodiment, an instance (variable), ActiveDlg, of the ConfirmationDlg class is created at runtime. More particularly, the instance is created when the Model Manager 645 detects that the actual Confirmation dialog has been activated, as shown by the following test script instructions:

```
ConfimationDlg ActiveDlg( )              // Instantiate ActiveDlg
ActiveDlg.Init( ClassName, Caption,
        Application, ResourceId )        // Initialize
```

When instantiated, ActiveDlg (or more specifically, its class constructor) loads the expected attributes for its components from the Resource Database 620. ActiveDlg also loads its own attributes, such as its expected caption and location/size, from the Resource Database as well. In this manner, each component of ActiveDlg (as well as ActiveDlg itself) binds itself at initialization to the actual screen object which it represents.

D. Resource Database

The Resource Database 620 stores expected or baseline information about the objects referred to in ATMs. Recall that the ATMs consist of instances of Generic Element Models. The Resource Database is where expected attributes of these GEM instances, such as label text, size, color, and the like, are stored. Thus, the database serves as an inventory of all resource information for an application under test.

By storing object attributes in a database, the need for "hard coding" textual or positional information within ATMs or within test scripts is eliminated. This is particularly advantageous because any textual or positional assumptions about a UI element often change, especially when the application is to be localized (i.e., translated to different languages) for several international versions. In this manner, the need for altering the ATMs or the test scripts every time the text label for a UI element changes is eliminated.

In a preferred embodiment, the Resource Database 620 itself is implemented using object database methodology. For instance, an exemplary resource database may be constructed using a single table defined as follows:

| Field Name | Type | Description |
| --- | --- | --- |
| UniqueId | String | Key field which uniquely identifies an object |
| Label | String | The text associated with an object |
| Parent | String | The object's parent name |

-continued

| Field Name | Type | Description |
| --- | --- | --- |
| PreferredName | String | Variable name used by the Model Generator to instantiate this object as |
| DefaultState | Integer | Default state of an object (checked, grayed, and the like) |
| Dimension | String | Expected location of this object relative to its parent origin (x1,y1,x2,y2) format |
| Attributes | Binary | Misc. attributes to be tested |
| Picture | Binary | Screen shot of the object preferably in a device independent format |

The table is keyed by (indexed on) the UniqueId and Label fields. Some fields are multi-purpose, depending on what object is stored in the record. For a menu item record, for instance, the Dimension field stores the order of the item within its popup menu. Further description of the fields is provided hereinbelow, during presentation of the Notepad example.

E. GEM Library

1. Overview

A Generic Element Model or GEM is perhaps best described by way of example. Consider an application program such as a Desktop Publisher (DTP) application. The application may be decomposed into its major UI components: Menus, Dialogs, ToolBar, Client Windows (which include scroll bars and system menus), and a Status Line. Each component can be broken down further. Menus, for instance, can be further reduced to four subtypes: top level pop-up menus, system menus, menu items, and side cars ("fly out" menus). The entire menu tree of any application can be described as instances of these four types of menus. Each one of these four types of menus can then be modeled by four corresponding types of Generic Element Models. Using these four GEMs, ATMs can be built which collectively represent the entire menu tree of the application. Thus given a small number of GEMs, one can build ATMs which represent the user interface of very complex applications.

As described above, a GEM encapsulates the behavior of irreducible user interface elements such as push buttons, checkboxes, listboxes, menu items, and the like. When a GEM is instantiated, it takes two parameters: a reference to its parent and a resource id which uniquely identifies this GEM among its siblings. During construction time, the GEM loads its expected results from the Resource Database using, in an exemplary embodiment, a key consisting of its parent's unique id concatenated with its own id. The GEM binds itself to the actual UI element on the screen which it represents, when requested to do so by its parent. At this point, the GEM can be instructed to run a self test ("Self-Test" method) on itself by simply comparing its expected attributes (loaded from the resource database) against its actual attributes (retrieved from the actual element on the screen which the GEM represents).

2. Detailed construction

In a preferred embodiment, all GEMs are derived from a base class, BaseGEM, which encapsulates the basic functionality offered by a empty or "faceless" UI element, such as processing a single or double mouse clicks, or getting input focus. BaseGEM may be constructed from the following class definition:

```
//class definition
class BaseGem( Pops, ResId )
    //Begin constructor
    ParentPtr = Pops //Reference to parent
    ParentWHndl = 0 //Parent Window Handle
    Id = ResId //Unique id for this GEM among its siblings
    Moniker = 0 //Live link to the actual UI element on screen
    ObjectType = 0 //Type of this GEM
    //These are expected values fetched from the resource data
    base
    Label = 0
    ParentName = 0
    DefState = 0
    Location = 0
    ShortCut = 0
    //End constructor
    function Bind( )
        //Load expected values from the resource database
        Defaults.LoadData( Pops.Id + "," + Id, Label, ParentName,
                        DefState, Location )
        Shortcut = GetNmemonic( Label )
        //Bind to the actual UI element on screen
        Moniker = ParentPtr.Moniker.FindItem( Id )
        ParentWHndl = ParentPtr.Moniker.WinHandle
    end
    function Detach( )
        Moniker = 0
    end
    function Select( )
        if (Shortcut == 0)
            return
        end
        KeyIn( ParentWHndl, "{ALT}" + ShortCut )
        //KeyIn( ) resides in Test RTL 630
    end
    function Click( )
        MouseClick( Moniker.WinHandle, LeftButton )
        //MouseClick( ) resides in Test RTL 630
    end
    function DblClick( )
        MouseDblClick( Moniker.WinHandle, LeftButton )
        //MouseDblClick( ) resides in Test RTL 630
    end
    function RightClick( )
        MouseClick( Moniker.WinHandle, RightButton )
        //MouseClick( ) resides in Test RTL 630
    end
    function RightDblClick( )
        MouseDblClick( Moniker.WinHandle, RightButton )
        //MouseDblClick( ) resides in Test RTL 630
    end
    KeyInto( Chars )
        KeyIn( Moniker.WinHandle, Chars )
    end
    function IsA( )
        return ObjectType
    end
    function Capture( )
        //Virtual function
        //Override w/ capture routine specific for object
    end
    function HasFocus( )
        DlgHndl = FindTheWindow( ParentPtr.Caption )
        return Moniker.Focus
    end
    function IsEnabled( )
        return IsWindowEnabled( Moniker.WinHandle )
    end
    function GEMTest( )
        Bist.Start ( XsA( ), Id )
        Bist.Verify( "Parent Name", ParentName,
            ParentPtr.Moniker.Caption )
        Bist.Verify( "Location", Location, Moniker.GotLocation( ) )
    end
end //End class definition of BaseGem
```

As shown above, BaseGem includes data members of a parent pointer, a parent window handle, a unique identifier, and a "Moniker". The parent pointer or ParentPtr is passed in (to the constructor) at initialization; for a dialog, the dialog passes in "self" (i.e., passes in a pointer to itself). The parent window handle (ParentWHndl) is set to the window handle of the parent pointer's moniker during operation of the bind function. The unique identifier or Id is a way to identify a particular control among its siblings. This may simply be the resource identifier (provided for Windows), or it may be an identifier assigned by the system. Again, this is passed in by the dialog at creation. The Moniker is a handle or live link to the actual UI element on screen. The object type or ObjectType indicates a windows type, such as checkbox, pushbutton, and the like.

The class also includes data members for storing expected values for the object (fetched from the Resource Database): Label, ParentName, DefState, Location, and ShortCut. The values for these are fetched from the Resource Database upon instantiation by calling the Defaults.LoadData method; ShortCut is determined from analyzing the Label (e.g., menu item label of &File indicates a ShortCut keystroke of Alt-F). During self test, the actual values may be compared to these expected values.

Also shown, BaseGem includes class methods or functions. The Bind() function binds the object to its actual screen object. In particular, the method employs a Windows Id to return a unique handle or "Moniker" for the screen object. A corresponding Detach() function is provided for detaching from the screen object; the Moniker is reset (to zero). Other class methods are provided for simulating user events. For instance, the Click(), DblClick(), RightClick(), and RightDblClick() methods perform their respective mouse clicks, by sending the corresponding Windows event message to the target object. Select(), on the other hand, keys in the shortcut (e.g., keyboard accelerator) for the object.

Other types of GEMs may be derived from BaseGEM. A CheckBox class, for example, may be derived. CheckBox inherits all the capabilities of BaseGEM and adds any behavior unique to it. It may be constructed as follows:

```
class CheckBox( Pops, ResId ) of BaseGEM( Pops, ResId )
    ObjectType = "CheckBox"
    // Get the state of the CheckBox
    function GetState( )
        if ( IsDlgButtonChecked( ParentWHndl, Id ) == 1 )
        // Note IsDlgButtonChecked( ) is std Win API (call) 670
            return "1"
        else
            return "0"
        end
    end
    function SelfTest( )
        GEMTest( )
        Bist.Verify( "Label", Label, Moniker.Caption )
        PrevState = GetState( )
            Click( )
            Bist.NonEqual( "Changing State", PrevState, GetState( ) )
            Click( )
            Bist.Done( )
    end
    function Capture( )
        dbDictionary Attributes( )
        // dbDictionary is test object provided by Test RTL
        Attributes.AddEntry( "Label", Moniker.Caption )
        Attributes.AddEntry( "Location",
            Moniker.Left + "," + Moniker.Top )
        Attributes.AddEntry( "State", GetState( ) )
        return Attributes
    end
end
```

As shown, CheckBox is a derived class and includes state behavior specific for its type, namely "Checked" (state "1") or "Unchecked" (state "0") for a CheckBox. Since the CheckBox knows about its own behavior and attributes, it includes methods for handling these specifics. For instance, CheckBox includes a GetState() method which returns whether the checkbox instance is "checked" or "unchecked." CheckBox adds its own SelfTest() function, which runs the GemTest() function (standard self test) as well as running additional tests specific for a checkbox (i.e., clicking itself and comparing its resulting state with its previous state). Capture() function for capturing the attributes of itself. Specifically for a checkbox, this entails capturing information about its Label (i.e., text displayed with the checkbox) and its state (whether it is "checked" or "unchecked"). These may be stored as entries in a database.

3. GEM Functionality

GEMs will now be summarized in terms of their specific functionality. In a preferred embodiment, GEMs include the following fundamental functionality: Self load, Self test, Binding to screen objects, Attribute capture, Next state, User interaction simulation, and Resource tracking. Each will be described in turn.

(a) Self load

GEMs contain no information about their characteristics (e.g., text labels) in their declaration or definition. Instead, a GEM loads its characteristics from the Resource Database during construction. Each GEM (which is a derived instance of a BaseGem class, presented above) is constructed with a unique resource identifier (ResId). Thus when a GEM is instantiated, the object containing the GEM passes a unique key to the constructor of the GEM. The constructor uses this key to load in the GEM's expected properties from the Resource Database:

```
Defaults.LoadData (Pops.Id+", "+Id, Label, ParentName, DefState,
    Location)
```

Each GEM is constructed only on an as-needed basis.

(b) Self test

All GEMs have a SelfTest member function. SelfTest enables the GEM to test itself by comparing its characteristics to the actual element on the screen that it represents. The basic test includes checking the position, label, parent name, and default state of the element. A CheckBox class, for instance, may include the following SelfTest class method:

```
function SelfTest( )
    GEMTest( )
    Bist.Verify( "Label", Label, Moniker.Caption )
    PrevState = GetState( )
        Click( )
        Bist.MonEqual( "Changing State", PrevState, GetState( ) )
        Click( )
        Bist.Done( )
end
```

As shown, the Checkbox. SelfTest method begins by calling GEMTest(), which verifies the position and parent for the object. SelfTest then verifies the text label for the checkbox screen object. Finally, the SelfTest method proceeds to test the checkbox with mouse click events. Here, the current state is saved (to PrevState). Then, a click event is executed (by calling the inherited Click() method for the object). At this point, the SelfTest compares the state of the object with the previously-saved state. As a checkbox functions as a toggle, its now-current state (i.e., after receiving the click event) should differ from the previously-saved state. This is confirmed by:

```
Bist.NonEqual ("Changing State", PreyStats, GetState() )
```

If the states are instead equal (i.e., the checkbox on the screen did not toggle), the test will fail. Upon completion of the test, the checkbox object is restored to its previous state.

In this fashion, all checkboxes of a program may test themselves to assure they are not defective. In addition to testing display attributes and receipt of input events, additional tests can be added to GEMs at any time in the QA cycle. When a test is added to the self test section, all instances of that GEM will automatically include the new test as well.

(c) Binding to screen objects

GEMs can attach themselves to the actual object on the screen that they represent. This ability to bind to screen elements enables any given visual element on the screen to be examined at runtime, greatly increasing the level of observability offered by the test automation system.

(d) Attribute capture

A GEM can construct a container object which captures the attributes of the actual screen element the GEM represents. This container object is an instance of the standard C++ dictionary class with an extra feature of persistence. The attributes of the screen element can be stored in a database (e.g., in the Resource Database) for later reference and comparison.

(e) Next state

GEMs may contain knowledge of what the next state of the program will be after the control the GEM represents is selected. For example, when a menu item is selected, a dialog box might appear. In this case, the menu item and the dialog box are related. As another example, clicking an OK button should cause the button to tell its parent (i.e., the dialog box containing the button) to destroy itself.

Next state relationships among GEMs are established using links within ATMs. Maintaining links among related GEMs in practice usually proves problematic and inefficient however. Therefore the burden of "knowing" the next state can be disabled within GEMs and transferred to a higher level which in this system is the Model Manager.

(f) User interaction simulation

Each GEM can simulate any possible operation that a user would perform an any given UI element, such as a mouse click, to getting focus, pressing a key, and the like. As shown above (in the BaseGEM class definition), for instance, a test script may simulate a click event at an object by invoking that object's Click() method.

(g) Resource tracking

GEMs can monitor resource usage. If there is a sudden drop or leakage in overall system resources, for example, GEMs may log warning messages.

F. Model Manager

The Model Manager 645 functions to monitor the active state of the application under test and load the appropriate model of the application under test at any given state. The Model Manager provides a key benefit. Instead of keeping the entire model of an application under test in memory, only a model corresponding to the active or live portion of the application under test need be loaded and executed. This approach yields improved performance and decreased intrusion over the application being tested.

The approach also frees the script developer from knowing the instance name of every single component within the application. Consider, for example, the commands for bringing up a file open dialog and clicking the OK button:

FileMenu.Open.Select ()

FileOpenDialog.OK.Click ()

In the above code, the script writer must know that after executing the first line, the resulting File Open dialog which was activated is referred to as FileOpenDialog. Keeping track of the names of every component within a large application is tedious and error-prone. Moreover, the instance FileOpenDialog must be instantiated even though the script may never use it.

In contrast, the following code performs the same as the one above, yet incurs much lower memory overhead and is easier for the script developer to maintain:

FileMenu.Open.Select ()

ActiveDlg.OK.Click ()

As shown, once the first line is executed, a global variable (ActiveDig) is automatically constructed by the Model Manager 645 by loading and executing the ATM which models this dialog. The Model Manager can also instruct the Model Generator to create a model on-the-fly if one does not already exist.

G. Model Generator

The Model Generator 625 generates ATMs 615 and the Resource Database 620. The Generator may employ resource information embedded in a program, live data on the screen, or a combination of both. In the event that all the necessary information is not available in a program resource, a control script may be constructed to take the application under test into necessary states so that the model generator may generate the appropriate ATM and Resource Database entries.

The Model Generator 625 also provides information about what changes were made between the current build and the previous run. In addition, the Model Generator shields old scripts from breaking (i.e., incurring errors) by using a field in the database called preferred name.

Application Modeling: Windows Notepad application

The method of the present invention for modeling a application will now be illustrated using a well-known application—Microsoft Windows Notepad. In this manner, the reader may focus on the teachings of the present invention without distraction from a complex application.

Figure 8A:
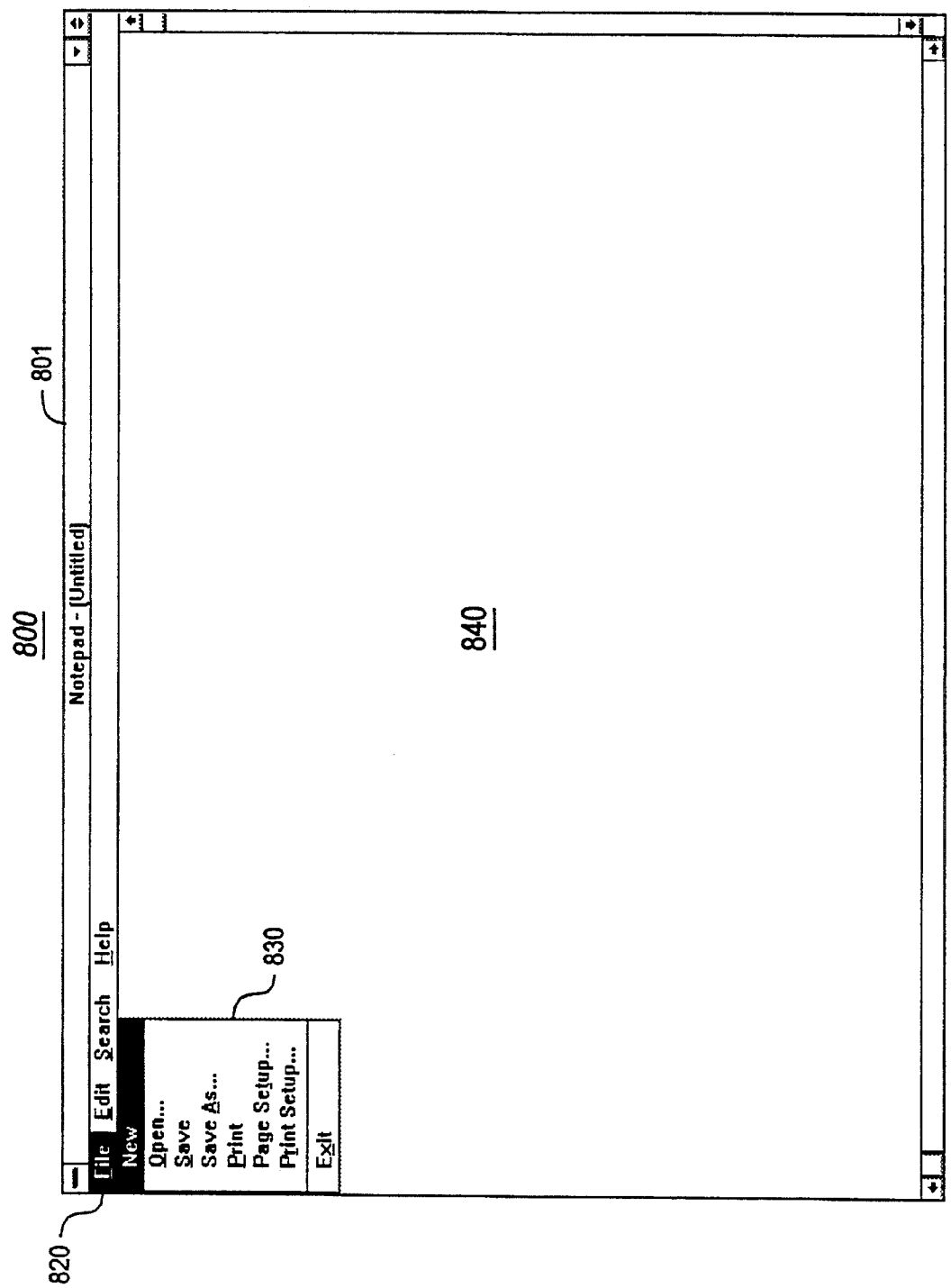
FIG. 8A is a bitmap screenshot illustrating Notepad—a simple Windows application for illustrating operation of the system of FIG. 6.

The creation of an Application Test Model (ATM) for the Windows Notepad application is illustrated in FIGS. 8A–D. In FIG. 8A, the interface for the Notepad application is shown. The interface includes a main or application window 800 having a caption bar 801, a menu bar 820, and a client area 840. Menu bar 820, in turn, invokes a plurality of submenus, such as submenu 830.

A. Menu

Figure 8B:
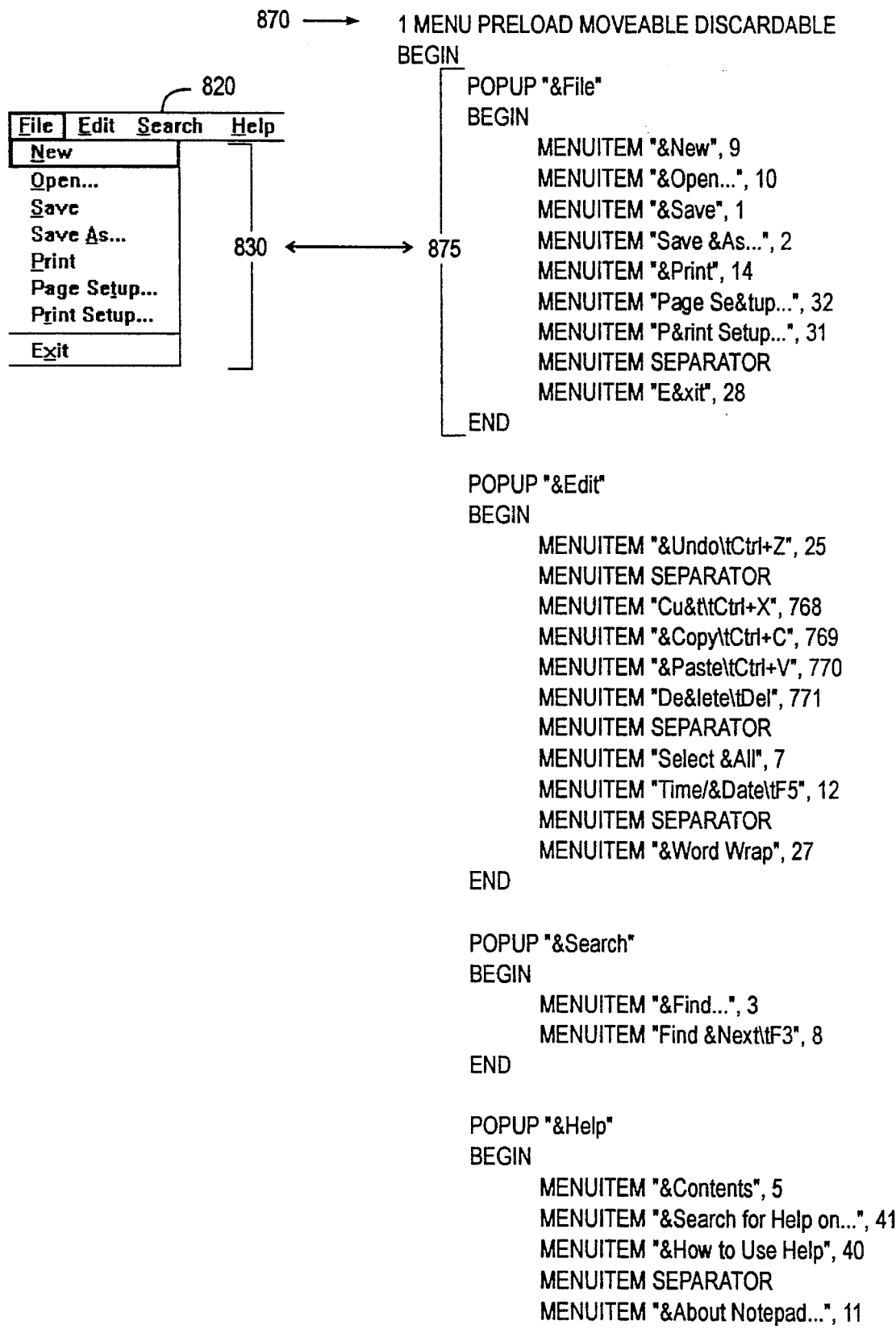
FIG. 8B is a diagram illustrating resource information for a screen menu of the application of FIG. 8A.

As shown in FIG. 8B, the menu bar 820 and its submenus may be decomposed into a resource file 870. Menu resource file 870 includes "popup" sections defining the submenus which are attached to the menu bar 820. Submenu 830, for instance, is defined by popup section 875. Thus as shown, the menu bar 820 and its submenus may be decomposed for tracking its individual elements. The decomposition into Application-specific Test Model (ATM) may be accomplished either by reading resource data from the EXE file (static method), or by executing the EXE file and inquiring about menu information (from the running application during runtime). A Model Generator implemented using the latter method provides an added advantage since it can extract dynamic menu attributes (grayed, checked, and the like) from the application. These attributes are generally not available in the resource file.

Figure 8C:
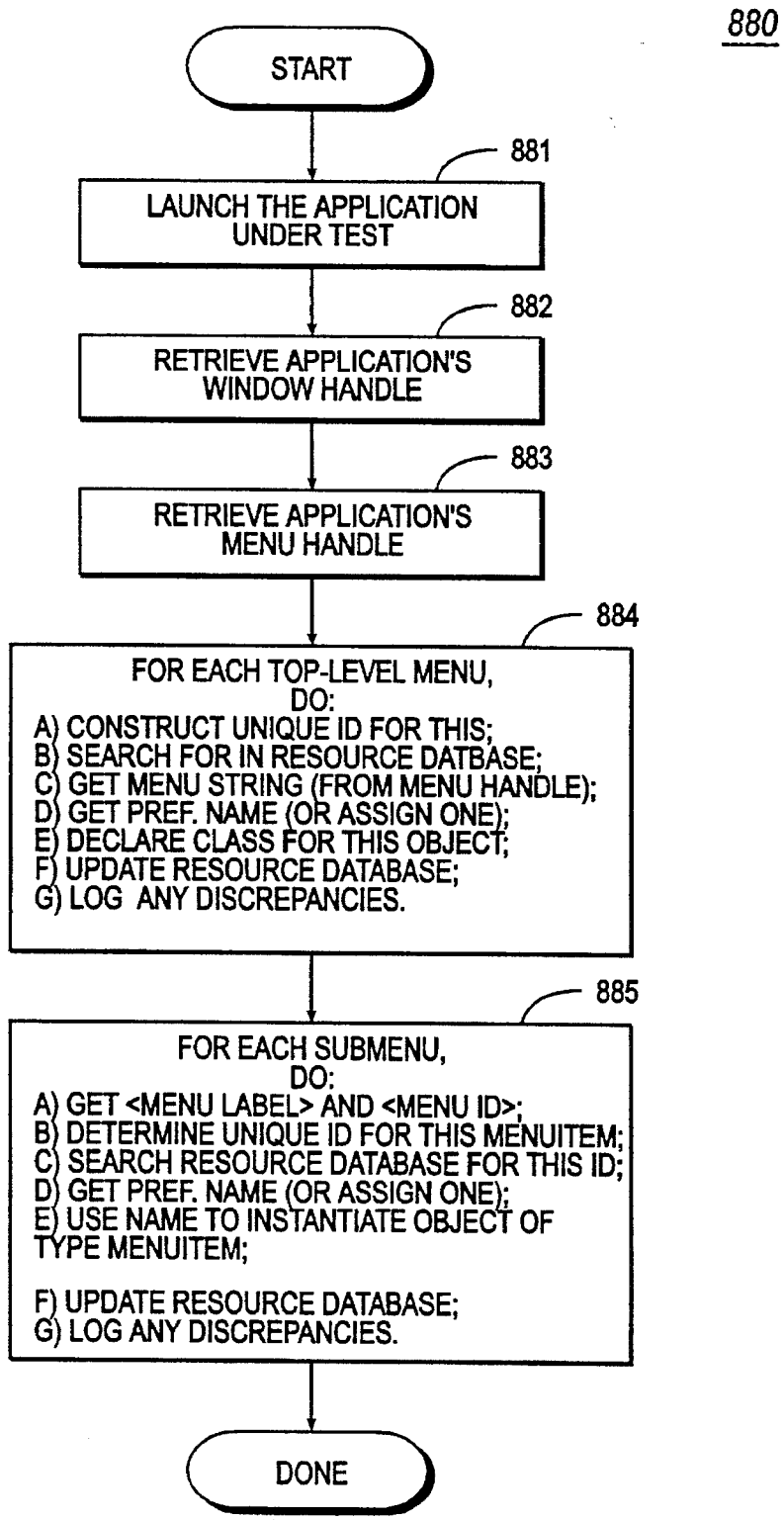
FIG. 8C is a flowchart illustrating a method of the present invention for decomposing (extracting) menu information for the Notepad application.

The method for generating menu ATMs using the dynamic approach is illustrated in FIG. 8C. At step 881, the application under test is launched. Next, at step 882, the application's window handle is retrieved. From the window handle the menu handle can be determined; this is indicated by step 883. For each top level menu, the following steps are performed at step 884. At step 884A, an unique id is constructed for this top level menu. At step 884B, the resource database is searched for the record under this id. At step 884C, the top level menu string from the menu handle is retrieved. A preferred name (if any) is also retrieved at step 884D; otherwise, a name based on the menu string is synthesized (e.g., "FileMenuATM" for menu item of "File"). Using the preferred (or synthesized) name, a class for this popup menu is declared at step 884E:

class FileMenuATM(Parent, Id) of PopUpMenu(Parent, Id)

When the class is instantiated, a reference to parent is passed as the Parent parameter, and this menu's unique id is passed as the Id parameter. At step 884F, the information for this top level menu in the Resource Database is updated, and at step 884G any discrepancies (changes between last run and this run) are logged in the log file.

For each submenu, the following steps are performed at step 885. At step 885A, the <menu string> and <menu id> of the menuitem are retrieved. A unique id for this menuitem is determined at step 885B, based on its parent's id and this menu item's id. At step 885C, the system looks up the record corresponding to this unique id in the Resource Database. At step 885D, a preferred name (if any) is retrieved from the PreferredName field (or is synthesized based on the menu string). This is used, in turn, at step 885E to instantiate a variable of type MenuItem as a data member of this ATM class:

MenuItem New(Self, 9)

The first parameter is a reference to this instance of the ATM class; the second parameter is the <menu id> of this menu item. At step 885F, the record in the Resource Database is updated An exemplary record for the File, ¦New menu item may be constructed as follows:

Unique Id: Notepad,#1,9

Label: &New

Parent: &File

PreferredName: New

State: integer denoting the state which is enabled, not grayed, not checked

Dimension: 1 (denotes the position of this menuitem within the popup menu). For menu items, the Dimension field of the Resource Database is used to describe the position of the menu item (Attributes and Picture fields are not used for the Notepad application menus.)

Finally at step 885G, any differences in the log file are recorded.

The menu class, FileMenuATM 915, is constructed for the menu bar 820 of the Notepad application as shown in FIG. 8D. FileMenuATM is a derived class of PopupMenu—a class which encapsulates the behavior of a popup; its relation to resource information 910 is shown. In a similar manner, a menu class for the Edit menu, EditMenuATM, is constructed from the resource information of the Edit menu of the Notepad application, as shown in FIG. BE.

B. Dialog

Figure 9A:
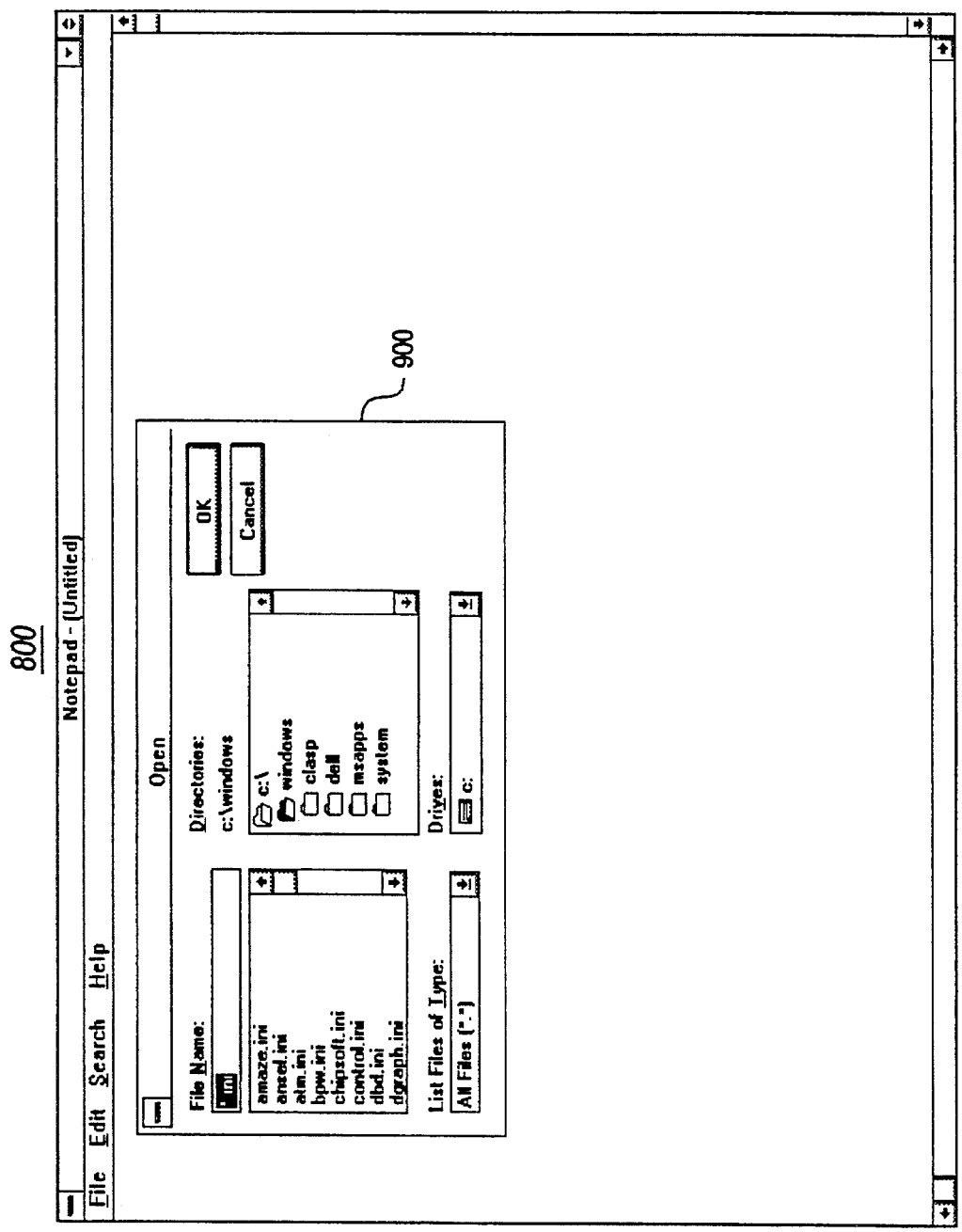
FIG. 9A is a bitmap screenshot illustrating a File Open dialog of the Windows Notepad application.
Figure 9B:
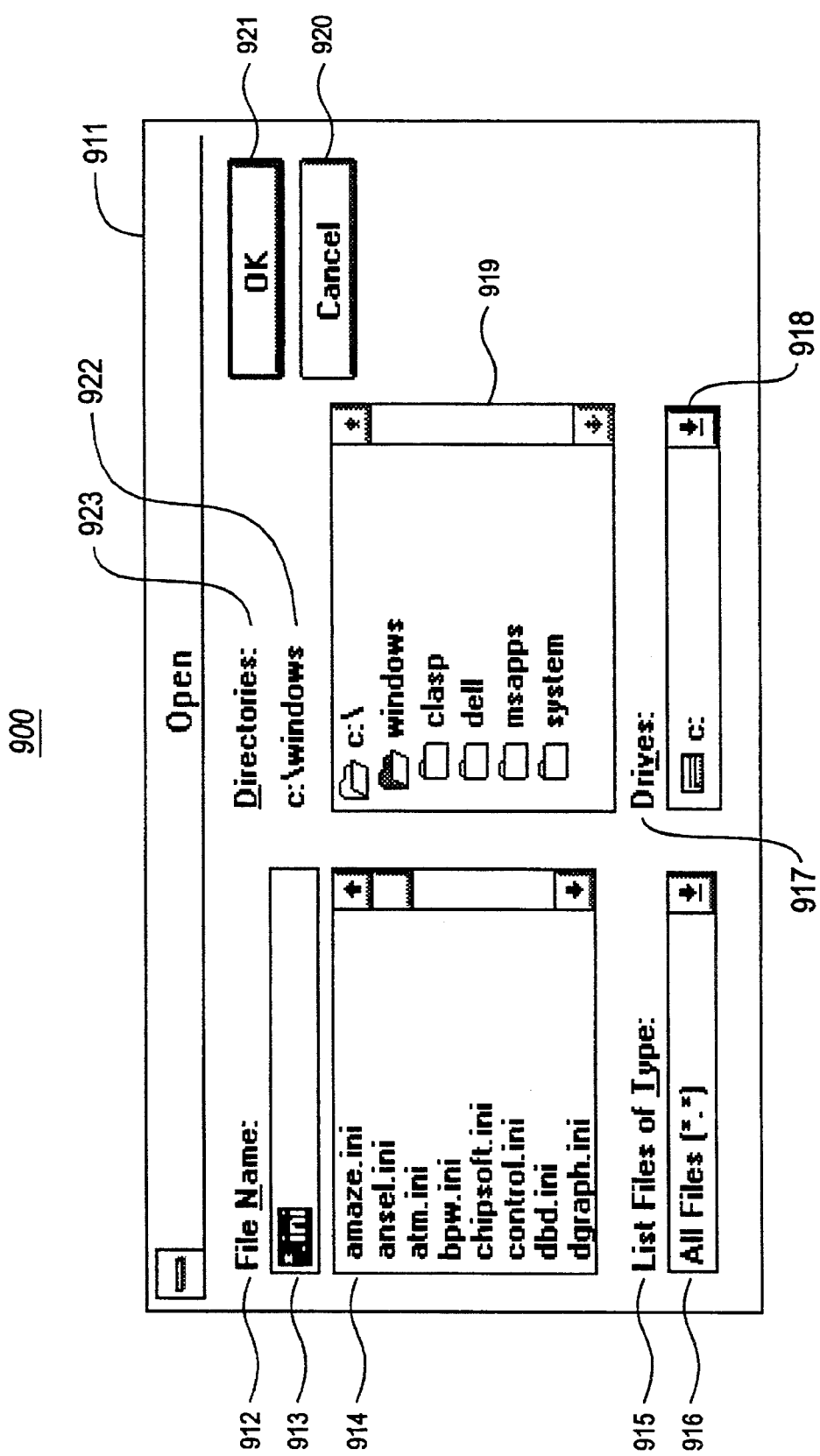
FIG. 9B is a bitmap screenshot illustrating children components (e.g., screen buttons, combo boxes, and list boxes) of the dialog of FIG. 9A.

When the user invokes a File,¦Open command (e g., by selecting "Open" from the submenu 830), the Notepad application 800 displays the Open dialog 900, shown in FIG. 9A. The dialog 900 includes a plurality of screen objects. As shown in further detail in FIG. 9B, the dialog 900 comprises a window 911 with caption bar and includes the following children: static text fields 912, 915, 917, 922, 923, edit text field 913, list boxes 914, 919, combo box 916, 918, and buttons 920, 921. Such a dialog is defined by the following resource information:

```
1536 DIALOG LOADONCALL MOVEABLE DISCARDABLE 36, 24, 264, 134
STYLE DS_MODALFRAME ¦ WS_POPUP ¦ WS_CAPTION ¦ WS_SYSMENU
CAPTION "Open"
FONT 8, "Helv"
{
LTEXT "File &Name:", 1090, 6, 6, 76, 9
EDITTEXT 1152, 6, 16, 90, 12, ES_AUTOHSCROLL ¦ ES_OEMCONVERT ¦
    WS_BORDER ¦ WS_TABSTOP
LISTBOX 1120, 6, 12, 90, 68, LBS_STANDARD ¦ NOT LBS_NOTIFY ¦
    LBS_OWNERDRAWFIXED ¦LBS_HASSTRINGS ¦ LBS_DISABLEROSCROLL ¦
    NOT WS_BORDER ¦ WS_TABSTOP
LTEXT "&Directories:", −1, 110, 6, 92, 9
LTEXT 10, 1088, 110, 18, 92, 9, SS_NOPREFIX ¦ WS_GROUP
LISTBOX 1121, 110, 32, 92, 68, LBS_STANDARD ¦ NOT LBS_NOTIFY ¦
    LBS_OWNERDRAWFIXED ¦ LBS_HASSTRINGS ¦ LBS_DISABLECOSCROLL ¦
    NOT WS_BORDER ¦ WS_TABSTOP
LTEXT "List Files of &Type:", 1089, 6, 104, 90, 9
COMBOBOX 1136, 6, 114, 90, 36, CBS_DROPDOWNLIST ¦ CBS_AUTOHSCROLL ¦
    WS_BORDER ¦ WS_VSCROLL ¦ WS_TABSTOP
LTEXT "Dri&ves:", 1091, 110, 104, 92, 9
COMBOBOX 1137, 110, 114, 92, 68, CBS_DROPDOWNLIST
    CBS_OWNERDRAWFIXED ¦ CBS_AUTOHSCROLL ¦CBS_SORT ¦
    CBS_HASSTRINGS ¦ WS_BORDER ¦ WS_VSCROLL ¦ WS_TABSTOP
DEFPUSHBUTTON "OK", 1, 208, 6, 50, 14, BS_DEFPUSHBUTTON ¦
    WS_GROUP ¦ WS_TABSTOP
PUSHBUTTON "Cancel", 2, 208, 24, 50, 14, WS_GROUP ¦ WS_TABSTOP
PUSHBUTTON "&Help", 1038, 208, 46, 50, 14, WS_GROUP ¦ WS_TABSTOP
CHECKBOX "&Read Only", 1040, 208, 68, 50 , 12, BS_AUTOCHECKBOX ¦
    WS_GROUP ¦ WS_TABSTOP
}
```

Application-specific Testing Model (ATM) generation for the dialogs of the Notepad application can be accomplished using the dynamic method as well. In order to bring up each dialog of the Notepad application, a small control script is constructed which "walks" the menu tree, brings up each dialog, and invokes the dialog model generator to create ATMs for each dialog.

Figure 9C:
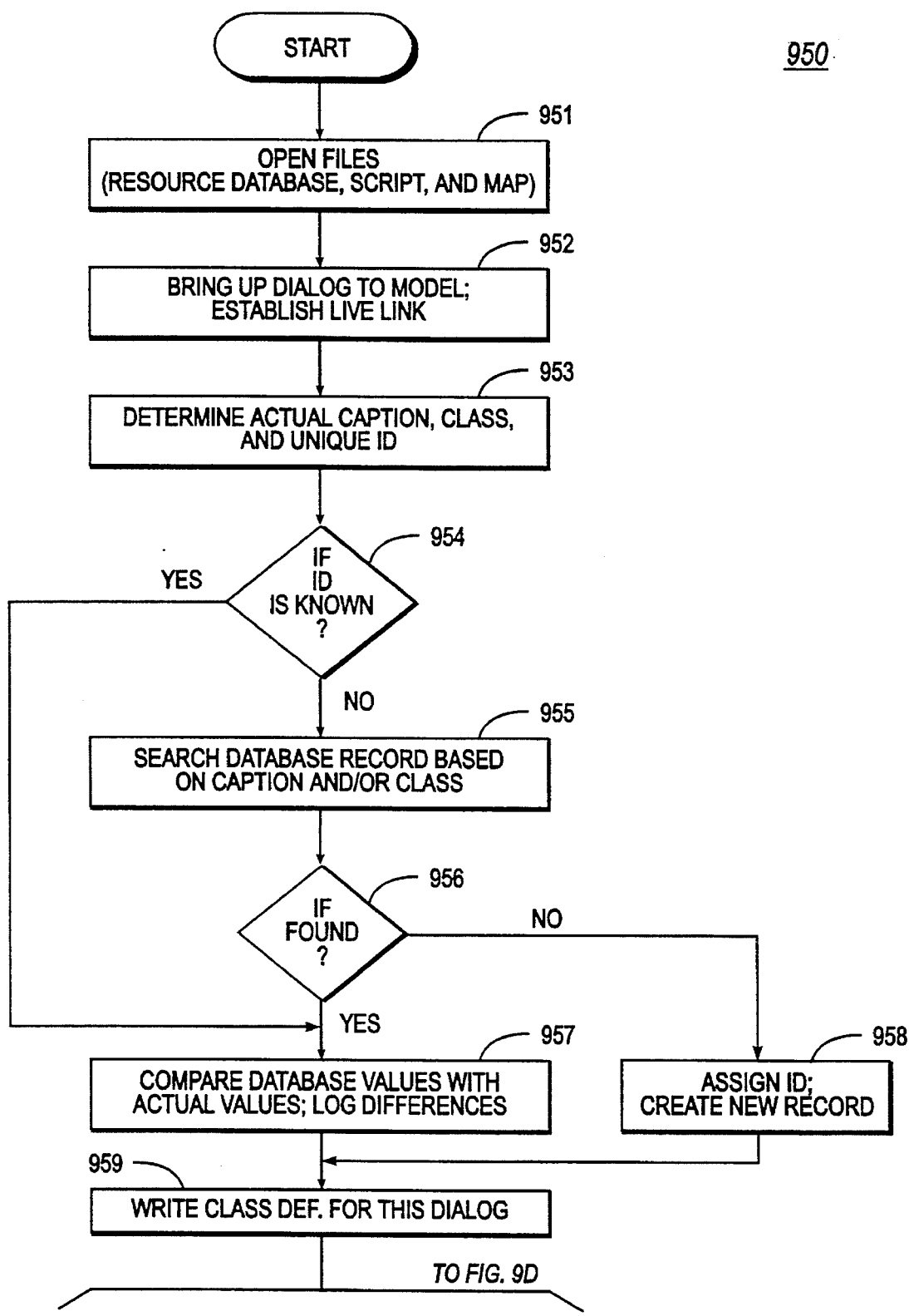
FIGS. 9C–D comprise a flowchart illustrating a method of the present invention for decomposing dialog information for the Notepad application.
Figure 9D:
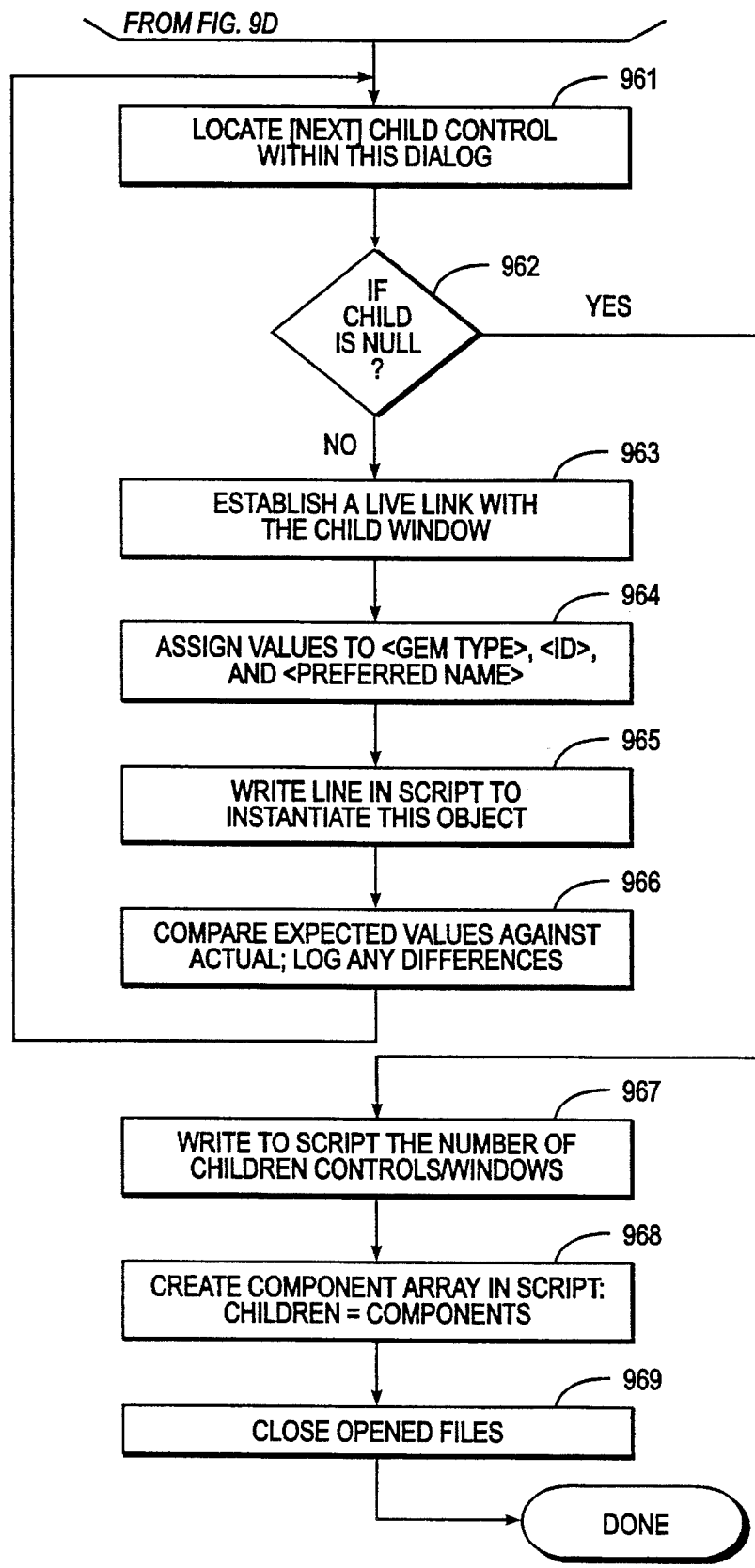

Referring now to FIGS. 9C–D, Model Generation for dialogs, using the dynamic method 950, is illustrated. In step 951, the following files are opened: the Resource Database for updating, a Script file for writing, and a MapFile for reading. (MapFile provides a mapping from the type of UI elements on the screen to the corresponding GEM type). In step 952, the dialog to be modeled is brought up (on the screen) and a live link is established with the dialog, using either a window handle or the Test Port. At step 953, the live link is used to determine actual caption, class, and unique id for this dialog. If, at step 954, the unique id (UniqueId) is known, the method proceeds to step 957. Otherwise, the method searches the Resource Database, based on caption and/or class of this dialog, in an attempt to locate the record corresponding to this dialog. If one is found (step 956), the method proceeds to step 957. If not found, however, a unique id is assigned to this dialog at step 958, with a new record being created for this dialog in the Resource Database (indexed by the unique id).

At step 957, the values in the record (corresponding to this dialog in the Resource Database) are compared to the actual dialog attributes (as displayed on screen). Any differences are logged; the record in the database is updated. At step 959, a class definition statement for this dialog is generated in the script file.

Next, the children controls are processed. At step 961, the (next) child control within this dialog is located. If child is NULL (no more children) at step 962, the method proceeds to step 967; otherwise, the method goes to step 963. At step 963, a live link is established with the child control (window). Based on the info available from the link to this child window (e.g., type, id, and label), the following values are assigned at step 964:

A) <GEM Type> gets its value from the MapFile based on the type of this child window. If no mapping available <GEM Type> set to BaseControl.

B) <Id> is set to the unique id, usually resource id, for this control.

C) <PreferredName> is set to the value under field PreferredName of the record in resource database corresponding to this control. If none found, synthesize a name based on the label or type of this control.

At step 965, a line is generated in the script file to instantiate a variable called <PreferredName> of type <GEM Type> with id <Id> as follows:

| <GEM Type> | <PreferredName> | ( Self, <Id>) |
|---|---|---|

At step 966, values in the record from Resource Database are compared to corresponding ones for the actual attributes of this control. Any differences are logged, and the database is updated accordingly. After this step, the method loops back to step 961 for processing the next child (if any).

At step 967, a line is inserted in the script denoting the number of children generated:

NumOfKids=<number of child windows or controls>

At step 968, a component array for this dialog is created in the script by enumerating all components of the dialog. Finally, the following two lines are written to the script file:

Children=Components

‖Where Children is a reference to the components of the dialog.

‖Children is used in BaseDlg class (see above). end

At step 967, all open files (i.e., Script file, Resource Database, and MapFile) are closed and the method concludes.

Following is a sample ATM created for the Open dialog 900 by the Model Generator:

```
class FileOpenDlg( ) of BaseDlg( )
    Statik          SFileName           ( Self, 1090 )
    Edit            FileName            ( Self, 1152 )
    ListBox         FilesLB             ( Self, 1120 )
    Statik          SDirectories        ( Self, −1 )
    Statik          Path                ( Self, 1088 )
    ListBox         DirectoryLB         ( Self, 1121 )
    Statik          Type                ( Self, 1089 )
    ComboBox        TypeCB              ( Self, 1136 )
    Statik          Drives              ( Self, 1091 )
    ComboBox        DriveCB             ( Self, 1137 )
    Button          OK                  ( Self, 1 )
    Button          Cancel              ( Self, 2 )
    Button          Network             ( Self, 1037 )
    Button          Help                ( Self, 1038 )
    CheckBox        ReadOnly            ( Self, 1040 )
    NumOfKids = 15
    local components = [ NumOfKids ]
    Components[ 0 ] = SFileName
    Components[ 1 ] = FileName
    Components[ 2 ] = FilesLB
    Components[ 3 ] = SDirectories
    Components[ 4 ] = Path
    Components[ 5 ] = DirectoryLB
    Components[ 6 ] = Type
    Components[ 7 ] = TypeCB
    Components[ 8 ] = Drives
    Components[ 9 ] = DriveCB
    Components[ 10 ] = OK
    Components[ 11 ] = Cancel
    Components[ 12 ] = Network
    Components[ 13 ] = Help
    Components[ 14 ] = ReadOnly
    Children = Components
end
```

Once testing models for the components of the Notepad application are constructed, a Test Model corresponding to the active portion of the Notepad application can be written as follows:

```
class NotepadModel( ExeName, ModuleName ) of
                        BaseWindow( ExeName, ModuleName )
    Edit Editor                     ( Self, 15 )
    FileMenuATM FileMenu            ( Self, "#1" )
    EditMenuATM EditMenu            ( Self, "#2" )
    SearchMenuATM SearchMenu        ( Self, "#3" )
    HelpMenuATH HelpMenu            ( Self, "#4" )
    NumOfKids = 5
    local Components = [ NumOfKids ]
    Components[ 0 ] = Editor
    Components[ 1 ] = FileMenu
    Components[ 2 ] = EditMenu
    Components[ 3 ] = SearchMenu
    Components[ 4 ] = HelpMenu
    Children = Components
end
```

As shown, the Testing Model of the Notepad application consists of an edit window and instances of ATMs. The former is represented by Editor which is an instance of the GEM type Edit; the latter represents the top level menus of Notepad application. The children array is a reference to the components of the Notepad application. Since the dialogs of Notepad are not active when this application is started, they are not included in the Test Model for this application. The models for the dialogs of Notepad are preferably kept in separate files on disk, only being instantiated by the Model Manager on a "demand-only" basis, thereby saving memory and system resources.

Once Application-specific Testing Models for the Notepad application are complete, a variety of self tests (i.e., more than one level of self test) can be invoked simply by executing the following script commands:

NotepadModel NotePad("notepad.exe", "NOTEPAD")
   NotePad. SelfTest(1) ||test level 1
   NotePad. SelfTest(2) ||test level 2
   NotePad. SelfTest(3) ||test level 3

If self test results are acceptable, test scripts based on the Notepad ATM can be executed. Upon invocation of a test script, the Test Runtime Library (RTL) is loaded, the Resource database is opened and initialized the GEM library classes are loaded, the Model Manager is started, and the Testing Model of the app under test is instantiated.

The Model Manager establishes an ApplicationLink and one or more WindowLinks with the application under test and attaches to the appropriate Application Translation Units (ATUs) as follows:

ApplicationLink NotepadApp("NOTEPAD")
   NotepadApp.AttachATU("WINATU.DLL")
   WindowLink AnyWindow(NotepadApp, "", "", 0)

These actions enable the CBT Message Engine to hook to the target application and monitor messages going to and coming from the application under test, thus allowing events of interest to be registered. The Model Manager typically registers an interest in three events for a target application: Window Creation, Window Activation (getting focus), and Window Destruction.

In addition to application-specific messages, the Model Manager may also asks the Message Engine to send notifications for system events such as Unexpected Application Errors (UAEs) or other system wide messages:

```
on SysObject.UAE( info )
   //code to handle an unexpected application error
end
```

Once the application under test is executed and all events of interest are registered by the Model Manager, a test script may be executed. This will be illustrated by studying execution of the following script:

```
Notepad.FileMenu.Open.Select( )        // Line 1
ActiveDlg.Filename.Set( "test.txt" )   // Line 2
ActiveDlg.OK.Click( )                  // Line 3
```

Line 1 executes the code associated with the Select() member function of class MenuItem. This code sets focus to the parent application (Notepad) and generates the shortcut (e.g., accelerator key sequence) for FileOpen menu (ALT+FO for the English version of the Notepad application). The shortcut is determined by concatenating the ALT key with the short cut keys for Notepad. FileMenu and Notepad.FileMenu.Open. These short cut characters are set during construction time when the GEMs load their expected data from the Resource Database. Notepad.FileMenu has "&File" as its label, therefore its shortcut character is the letter F (first character following the & in &File). By the same token, the label of Notepad. FileMenu. Open is &Open so its shortcut key is the letter O.

Once line 1 is executed, the Notepad application receives an ALT+FO key sequence and in turn responds by creating the File Open dialog (dialog 850 of FIG. 8D). Since the Model Manager registered an interest in any window creation message coming from the Notepad application, the Message Engine dispatches this event to the Model Manager. Specifically, the Message Engine notifies the Model Manager that the Notepad application is about to create a dialog of a specific class with a caption called "Open". The Model Manager then looks in the Resource Database for such a dialog. Based on the PreferredName field of the record associated with this dialog in the Resource Database, the Model Manager determines what file on disk provides the Testing Model for this dialog.

Next, all the children of File Open dialog are created. Upon receiving a message indicating that the File Open dialog got activated (on AnyWindow.Activate(info)), the Model Manager instructs the Script Engine to load and execute the ATM corresponding to the File Open dialog. Once this ATM is executed, all the GEM instances in the ATM load their expected results from the Resource Database and bind themselves to the actual screen objects within the File Open dialog. At this point, the variable ActiveDig is instantiated and initialized. It represents the Testing Model of the File Open dialog.

Line 2 executes the Set() member function of ActiveDig. Filename, which is an instance of a Edit box GEM. The function sets focus to the Filename edit box within the File Open dialog and sends the key sequence "test.txt" to the edit box. Line 3 generates a left mouse click on the OK button (button 861) of the dialog. This leads to a window destroy message being generated. Since the Model Manager has registered an interest in this message as well, the appropriate event handler gets executed, freeing up the memory associated with the ActiveDig and its components.

Advantages

The present invention provides independence from positional and textual characteristics. As shown in the sample code above, test scripts assume nothing about the physical location or text label associated with the actual object on the screen. This is possible because components which can bind to the corresponding screen element dynamically during runtime make up the test model. The components can also load their expected characteristics from a database table that stores resource information.

The present invention provides a built-in self test for objects. Once the QA engineer constructs the model of the application, the model tests itself to ensure that the model matches the application. Each component of the model can also test itself. This self-testing capability serves as an acceptance criteria for new versions of the application being tested. The system can also employ the model of the application to automatically generate test scripts that test the application. The model determines the application's reliability by randomly testing the application and measuring the average time between failures.

Besides taking screen shots, the system of the present invention can capture the visual state of an application by saving attributes of each screen element. For instance, attributes may be saved in a binary field of a database, which a QA engineer can analyze further. The engineer can record a failure caused by a change in location or size of a screen element as a warning rather than a false negative.

Using the information stored in the Resource Database and the Message Engine, the system can perform high-level recordings. Specifically, the mouse and keyboard actions used to control the application are mapped into high-level test scripts. These scripts do not assume anything about the location or text associated with screen elements.

By storing all resource-specific test data in a database, localization is facilitated. The test scripts may run on localized versions of the application without any modifications. Also, test scripts written for one GUI platform can run on any other GUI environment if the Script Engine and other components are available in the new environment. Because changes in the application are handled by the model, not by test scripts, test script maintenance is reduced.

GEMs of the present invention provide maximum controllability and observability over the actual screen objects that they represent. In particular, the user interface is broken down into irreducible components which are modeled to provide maximum controllability and observability (over the actual screen objects that they represent). The Test Model, which itself is built from these components, thus also provides maximum controllability and observability. Accordingly, testing effectiveness is maximized.

While the invention is described in some detail with specific reference to a single preferred embodiment and certain alternatives, there is no intent to limit the invention to that particular embodiment or those specific alternatives. Thus, the true scope of the present invention is not limited to any one of the foregoing exemplary embodiments but is instead defined by the following claims.

Appendix A. Exemplary CBT Messages 1) menuSelect:

Sent when an item is highlighted in a pulldown menu.

Translates $WM_{13}$ MENUSELECT events.

2) menuChoose:

Sent when an item is chosen from the menubar.

Translates WM_COMMAND events caused by menu items.

3) windowActivate:

Sent when a window is about to become active.

Translates HCBT_MOVE events within the CBT hook.

4) windowMove:

Sent when a window is about to be moved.

Translates HCBT_MOVE events within the CBT hook.

5) windowShow:

Sent when a window is about to be minimized, maximized or restored.

Translates HCBT_MINMAX events within the CBT hook.

6) windowClose:

Sent when a window is about to be closed.

Translates WM_CLOSE events.

7) mouseEnter:

Sent when the mouse pointer enters a window.

Performs hit-testing during WM_SETFOCUS events.

8) mouseLeave:

Sent when the mouse pointer leaves a Window.

Generated at the same time as the mouseEnter message. It is dispatched to the window that received the previous mouseEnter message.

9) mouseClick:

Sent when a mouse button is clicked or double clicked.

Translates WM_{NC} {L, R}BUTTONDOWN and BUTTONDBLCLK events.

10) anyEvent:

Sent when any other CBT message is received, but no corresponding script module is defined. This is the default message for each handler . . .

11) applicationClose:

Sent when the application is about to terminate.

Translates WM_CLOSE event.

12) winHelpMessage:

Sent when the Windows 3.1 help engine sends information to the CBT system.

This message is generated when WinHelp calls a public function within the Message Engine.

13) editEnter:

Sent when an Editbox is about to receive the input focus.

Translates HCBT_SETFOCUS events within the CBT hook.

14) editLeave:

Sent when an Editbox is about to lose the input focus.

Translates HCBT_SETFOCUS events within the CBT hook.

15) editChar:

Sent for each keystroke typed within an Editbox.

Translates WM_CHAR events.

16) listboxEnter:

Sent when a Listbox is about to receive the input focus.

Translates HCBT_SETFOCUS events within the CBT hook.

17) listboxLeave:

Sent when a Listbox is about to lose the input focus.

Translates HCBT_SETFOCUS events within the CBT hook.

18) listboxSelect:

Sent when an item in a Listbox is selected.

Translates WM COMMAND events where wParam == LBN_SELCHANGE 19) listboxDblClick:

Sent when an item in a Listbox is double clicked.

Translates WM_LBUTTONDBLCLK events within the Listbox.

20) comboEnter:

Sent when a Combobox is about to receive the input focus.

Translates HCBT_SETFOCUS events within the CBT hook.

21) comboLeave:

Sent when a Combobox is about to lose the input focus.

Translates HCBT_SETFOCUS events within the CBT hook.

22) comboChar:

Sent for each keystroke entered within a Combobox.

Translates WM_CHAR events.

23) comboSelect:

Sent when an item in a Combobox is selected.

Translates WM_COMMAND events where wParam== CBN_SELCHANGE.

240 comboDblClick:

Sent when an item in a Combobox is double clicked.

Translates WM_LBUTTONDBLCLK events within the Combobox.

25) buttonEnter:

Sent when a Button is about to receive the input focus.

Translates HCBT_SETFOCUS events within the CBT hook.

27) buttonLeave:

Sent when a Button is about to lose the input focus.
Translates HCBT_SETFOCUS events within the CBT hook.

27) buttonClick:

Sent when a Button is clicked.

Translates WM COMMAND events where wParam== BN_CLICKED.

28) scrollEnter:

Sent when a Scrollbar is about to receive the input focus.

Translates HCBT_SETFOCUS events within the CBT hook.

29) scrollLeave:

Sent when a Scrollbar is about to lose the input focus.

Translates HCBT_SETFOCUS events within the CBT hook.

| Appendix B. Exemplary CBT Message Handlers: | | | |
|---|---|---|---|
| Message Handler Class | Message Name | Message Type | EventInfo Object |
| Target Window: | - menuSelect | Notify | MenuInfo |
| | - menuChoose | Confirm | MenuInfo |
| | - windowActivate | Confirm | WindowInfo |
| | - windowMove | Confirm | WinPositionInfo |
| | - windowShow | Confirm | WinShowInfo |
| | - windowClose | Confirm | WindowInfo |
| | - mouseEnter | Notify | MouseInfo |
| | - mouseLeave | Notify | MouseInfo |
| | - mouseClick | Confirm | MouseInfo |
| | - anyEvent | Confirm | WindowInfo |
| Target Application: | - applicationClose | Confirm | WindowInfo |
| TargetWinHelp: | - winHelpMessage | Notify | WinHelpInfo |
| TargetEditbox: | - editEnter | Confirm | WindowInfo |
| | - editLeave | Confirm | WindowInfo |
| | - editChar | Confirm | KeyboardInfo |
| TargetListbox: | - listboxEnter | Confirm | WindowInfo |
| | - listboxLeave | Confirm | WindowInfo |
| | - listboxSelect | Notify | ListInfo |
| | - listboxDblClick | Confirm | ListInfo |
| TargetComboBox: | - comboEnter | Confirm | WindowInfo |
| | - comboLeave | Confirm | WindowInfo |
| | - comboChar | Confirm | KeyboardInfo |
| | - comboSelect | Notify | ListInfo |
| | - comboDblClick | Confirm | ListInfo |
| TargetButton: | - buttonEnter | Confirm | WindowInfo |
| | - buttonLeave | Confirm | WindowInfo |
| | - buttonClick | Confirm | WindowInfo |
| TargetScrollbar: | - scrollEnter | Confirm | WindowInfo |
| | - scrollLeave | Confirm | WindowInfo |

| Appendix C. Message Handler Properties | | |
|---|---|---|
| Message Handler Class | Property Name | Description |
| Target Window: | - Name | Title string of the control. |
| | - Class | Windows class of the control. |
| | - ID | Resource ID of the control. |
| | - Style | Style flags of the control. |
| | - Enable | Whether the control is enabled. |
| | - Position | Coordinates of the control |
| | - EventInfo | Current EventInfo object (if any) |
| Target Application: | - Show | How the application is displayed. |
| TargetWinHelp: | - Text | Text sent from or to WinHelp. |

Appendix C. Message Handler Properties

| Message Handler Class | Property Name | Description |
| --- | --- | --- |
| TargetEditbox: | - EditText | Text contained in the Editbox |
| TargetListbox: | - SelectionIndex | Index of the selected item in the Listbox. |
| | - SelectedString | String which is currently selected in the Listbox. This is valid only if the Listbox contains strings. |
| ComboBox: | - EditText | Text contained in the Combobox edit field. |
| | - SelectionIndex | Index of the selected item in the Combobox list. |
| | - SelectionText | String which is currently selected in the Combobox. This is valid only if the Combobox contains strings. |
| TargetScrollbar: | - ScrollValue | Current position of the scrollbar thumb. |

Appendix D: A Sample Lesson Script:

```
The following CBT lesson illustrates a sample
ObjectVision ® tutorial.
lesson "OVDemo"
script for "Initialization"
//
// Create a message handler for the target application.
// Create a Bitmap Interaction window
// Create a dialog box control window
//
    TargetApplication OVApp("ObjectVision")
    BitmapWindow theBitmapWnd0
    ControlWindow theControlWnd(100)
//
// Set up a global message handler for the EXIT
// button on the CBT Control window . . .
//
    on theControlWnd.exitButton
        theCbtLesson.exit
    end
end
script for "Scene0"
//
// Disable the target application. When the app is disabled no
// events are dispatched to the CBT
//
    OVApp.disable
//
// When the Next button in the control dialog box is pressed,
// show the target application, show the first bitmap and
// goto the next scene
//
    on theControlWnd.nextButton
        OVApp.activate(SW_SHOWNORMAL)
        theBitmapWnd.show("BMP_1")
        theCbtLesson.perform("Scene1")
    end
end
script for "Scene 1"
//
// When the Next button in the control dialog box is pressed,
// enable and maximize the target application, show the next
// bitmap and goto the next scene.
// Remember, the application is still disabled so we don't
// need to worry about messages from it.
//
    on theControlWnd.nextButton
        OVApp.enable
        OVApp.activate(SW_MAXIMIZE)
        theCbtLesson.perform("Scene2")
    end
end
```

```
script for "Scene2"
//
// Show the bitmap for the second scene . . .
//
    theBitmapWnd.show("BMP_2")
//
// If the target application is about to close, stop the message
//
    on OVApp.close
        OVApp.stopMessage
    end
//
// Stop all right mouse button clicks since these will bring up
// a property inspector.
//
    on OVApp.mouseClick
        if( OVApp.eventInfo.isRightButton )
            OVApp.stopMessage
        end
    end
//
// If one of the Properties | Object menu items is chosen,
// then show the approppiate bitmap and goto the next
// scene . . .
// Otherwise, stop the message . . .
//
    on OVApp.menuChoose
        isValidChoice = 0
        if( OVApp.eventInfo.menuId == 69 )
            theBitmapWnd.show("BMP_31")
            isValidChoice = 1
        end
        if( OVApp.eventInfo.menuId == 52 )
            theBitmapWnd.show("BMP_32")
            isValidChoice = 1
        end
        if( OVApp.eventInfo.menuId == 53 )
            theBitmapWnd.show("BMP_33")
            isValidChoice = 1
        end
      . //
      . // This continues for each menu item of interest.
      . //
        if( isValidChoice == 0 )
            OVApp.stopMessage
            theCbtLesson.perform("SceneError")
        end
        if( isValidChoice == 1 )
            theCbtLesson.perform("Scene3")
        end
    end
```

Appendix D: A Sample Lesson Script:

```
end
script for "Scene3"
//
// Create message handlers for the OK and Cancel buttons in
// the dialog box in the target application.
//
    TargetButton theOKBtn(1)
    TargetButton theCancelBtn(2)
//
// If either of theses buttons is pressed, then
// go back to scene 2.
//
    on theCancelBtn.buttonClick
        theCbtLesson.perform("Scene2")
    end
    on theOKBtn.buttonClick
        theCbtLesson.perform("Scene2")
    end
end
script for "SceneError"
//
// Show the error screen and wait for the
// user to do anything in the target application.
//
    theBitmapWnd.show("BMP_ERR")
    on OVApp.anyEvent
        OVApp.stopMessage
        theCbtLesson.perform("Scene2")
    end
end
end // lesson
```

Appendix E: Window Proxy

```cpp
#ifndef _WINPROXY_HPP
#define _WINPROXY_HPP
#ifndef _CBTOBJ_HPP
#include "base\cbtobj.hpp"
#endif
#ifndef _PWINDOW_HPP
#include "protocol\pwindow.hpp"
#endif
#ifndef _PINTERAT_HPP
#include "protocol\piterat.hpp"
#endif
#ifndef CLIENT_HPP
#include "lucy\client.hpp"
#endif
#define WINDOWPROXY_NUMPROTS 2
class SHARED_CLASS WindowProxy: public Cbtobject,
                                public ProtWindow,
                                public ProtIterator
{
protected:
HTASK      hTargetTask;
HWND       hWndTarget;
HWND       hcurrItem;
char *     strTaskName;
char *     strWindowName;
char *     strWindowClass;
int        iWindowId;
LONG       lWindowStyle;
public:
WindowProxy(const char *strTask,
const char *strClass,
const char *strTitle);
WindowProxy(HWND hwnd);
virtual             -WindowProxy( );
virtual   ushort    Supports(hProtocol &Hdl)
const;
\*
** ProtWindow funcs
*\
virtual   BOOL      Visible(BOOL bFlag, BOOL
bState);
virtual   const char *   Caption (BOOL bFlag, const
char *);
virtual   int       X(BOOL bFlag, int x);
virtual   int       Y(BOOL bFlag, int y);
virtual   int       W(BOOL bFlag, int w);
virtual   int       H(BOOL bFlag, int h);
virtual   const char *   WindowClass(BOOL, const char
*);
virtual   UINT      WindowResId(BOOL, UINT);
virtual   HWND      Handle( );
virtual   BOOL      Arrow(const cLucyObj
*pTW,                     BOOL
```

-continued

Appendix E: Window Proxy

```
bAutoDestroy,
COLORREF rgbcolor,          BOOL
bSubRect,                   int x,
int y, int w, int h);
virtual    const cLucyObj   GetTargetApp(void);
virtual    BOOL             Focus(BOOL bFlag, BOOL
bState);
virtual    BOOL             Update( );
virtual    BOOL             Topmost(BOOL, BOOL);
\*
** ProtIterator methods
*\
virtual    cLucyObj *       First( );
virtual    cLucyObj *       Next( );
virtual    cLucyObj *       FindItem(UINT id);
CBTOBJECT_INFO(WindowProxy, "WINDOWPROXY")
PROTOCOL_INFO (WindowProxy, Info, WINDOWPROXY_NUMPROTS)
protected:
           BOOL             BindToWindow(HWND
hWnd);
};
#endif
```

What is claimed is:

1. A computer-aided system for testing operation of an application program having a user interface, the system comprising:

means for storing a library of generic element models, each said generic element model encapsulating functionality and behavior for a single user interface element;

means for creating a test model of said application program by combining selected ones of said generic user interface elements into at least one application-specific testing model, each said at least one application-specific testing model representing a high-level model for a specific user interface component for the application program;

message engine means for monitoring events during operation of the application program; and script engine means for specifying actions of said test model to be undertaken upon occurrence of selected ones of the events.

2. The system of claim 1, wherein user interface elements modeled by said generic element models include selected ones of a push button, a check box, a list box, and a text object.

3. The system of claim 1, wherein specific user interface components for the application program include selected ones of a menu, a toolbar, a dialog, a client-area window, and a status line.

4. The system of claim 1, wherein said events include system events generated by operating system software.

5. The system of claim 1, wherein said events include application-specific events which result from non-system events occurring within said application program.

6. The system of claim 1, wherein functionality for a user interface element includes how the element responds to occurrence of events during operation of the application program.

7. The system of claim 1, wherein behavior for a user interface element includes screen attributes specifying how the element is displayed on a screen during operation of the application program.

8. The system of claim 7, wherein said screen attributes include selected ones of screen position, size, color, and font.

9. The system of claim 7, wherein said screen attributes include a default state.

10. The system of claim 7, further comprising:

a database for storing expected values of screen attributes for user interface elements of the application program.

11. The system of claim 10, further comprising:

comparison means for comparing expected values stored in the database to actual values for user interface elements of the application program at runtime.

12. The system of claim 11, further comprising:

self-testing means for automatically invoking default functionality of each said at least one application-specific testing model for the application program and comparing actual behavior of each said at least one application-specific testing model with its expected behavior.

13. The system of claim 1, wherein said script engine means operates in response to a test script, said test script including high-level commands specifying a test in terms of actions to occur at selected ones of specific user interface components for the application program.

14. The system of claim 1, wherein said means for creating a test model includes:

means for decomposing the application program into irreducible user interface components.

15. The system of claim 14, wherein said means for decomposing includes:

means for reading resource information from the application program, said resource information specifying creation of user interface elements of the application program at runtime.

16. The system of claim 14, wherein said means for decomposing includes:

means for operating the application program and monitoring creation of user interface elements of the application program at runtime.

17. The system of claim 1, further comprising:

means for dynamically binding each said at least one application-specific testing model with the actual specific user interface component it represents.

18. The system of claim 1, wherein said specified actions include user events for simulating operation of the application program by a user.

19. The system of claim 18, wherein said user events include selected ones of keyboard device and mouse device input events.

20. In a computer system, a method for testing operation of an application program having a user interface, the method comprising:

(a) creating a test model of said application program by combining pre-supplied generic element models into at least one application-specific testing model, each said generic element model encapsulating functionality and behavior for a single user interface element, each said at least one application-specific testing model representing a high-level model for a specific user interface component for the application program;

(b) monitoring events during operation of the application program; and (c) specifying actions of said test model to be undertaken upon occurrence of selected ones of the events, whereupon a specified action in the application program is effected in response to occurrence of said selected events.

21. The method of claim 20, wherein said generic element models represent selected ones of a push button, a check box, a list box, and a text object.

22. The method of claim 20, wherein specific user interface components for the application program include selected ones of a menu, a toolbar, a dialog, a client-area window, and a status line.

23. The method of claim 20, wherein said events include selected ones of events generated by operating system software and events occurring within said application program.

24. The method of claim 20, wherein behavior for a user interface element includes screen attributes specifying how the element is displayed on a screen during operation of the application program.

25. The method of claim 24, wherein said screen attributes include selected ones of screen position, size, color, and font.

26. The method of claim 24, further comprising:

storing in a database expected values of screen attributes for user interface elements of the application program.

27. The method of claim 26, further comprising:

comparing expected values stored in the database to actual values for user interface elements of the application program at runtime.

28. The method of claim 27, further comprising:

sequentially testing each specific user interface component which is modeled by invoking default functionality of each said at least one application-specific testing model for the application program and comparing actual behavior of each said at least one application-specific testing model with its expected behavior.

29. In a computer system, a method for testing operation of a graphical user interface, the method comprising:

(a) creating for the graphical user interface at least one model for testing user interface elements, each said at least one model being constructed from a set of generic objects representing basic user interface elements;

(b) providing each model a link to its actual user interface element;

(c) storing for each model a set of expected characteristics that its actual user interface element is to exhibit;

(d) trapping a request to create a user interface element; and (e) in response to a trapped request, loading a model for the user interface element which is requested to be created and comparing its actual characteristics to said stored expected ones.

30. The method of claim 29, further comprising:

(f) providing each model with a set of methods for simulating operation of its user interface element; and (g) simulating runtime operation of the graphical user interface by invoking methods for selected ones of the user interface elements.

31. The method of 30, wherein step (g) includes:

providing a test script, said test script having high-level commands for simulating operation of the graphical user interface.

32. The method of 31, wherein said high-level commands include a general format of:

[object].[action]

where [object] specifies a user interface element and [action] specifies a simulated operation for the object.

33. The method of claim 29, wherein specific user interface elements include selected ones of a menu, a toolbar, a dialog, a client-area window, and a status line.

34. The method of claim 29, wherein step (d) includes:

registering an interest in a system message which indicates that a user interface element is about to be created; and monitoring for occurrence of said system message.

35. The method of claim 34, wherein said graphical user interface includes Microsoft® Windows graphical user interface, and said system message is a Microsoft® Windows CreateWindow message.

\* \* \* \* \*